United States Patent
Grove et al.

(10) Patent No.: US 9,798,750 B2
(45) Date of Patent: Oct. 24, 2017

(54) PARAMETER DOWNLOAD VERIFICATION IN INDUSTRIAL CONTROL SYSTEM

(71) Applicant: Invensys Systems, Inc., Foxboro, MA (US)

(72) Inventors: Eric P. Grove, Dallastown, PA (US); Donald R. Tunnell, Jr., Perkiomenville, PA (US); Christopher Justin Miller, Emigsville, PA (US)

(73) Assignee: Schneider Electric Software, LLC, Lake Forest, CA (US)

(*) Notice: Subject to any disclaimer, the term of this patent is extended or adjusted under 35 U.S.C. 154(b) by 564 days.

(21) Appl. No.: 14/513,826

(22) Filed: Oct. 14, 2014

(65) Prior Publication Data

US 2015/0105888 A1 Apr. 16, 2015

Related U.S. Application Data

(60) Provisional application No. 61/890,800, filed on Oct. 14, 2013, provisional application No. 61/974,895, filed on Apr. 3, 2014.

(51) Int. Cl.
*G06F 19/00* (2011.01)
*G06F 17/30* (2006.01)
*G05B 19/418* (2006.01)

(52) U.S. Cl.
CPC .. *G06F 17/30309* (2013.01); *G05B 19/41865* (2013.01); *G05B 2219/32097* (2013.01); *G05B 2219/32306* (2013.01); *Y02P 90/20* (2015.11)

(58) Field of Classification Search
None
See application file for complete search history.

(56) References Cited

U.S. PATENT DOCUMENTS

| | | | | |
|---|---|---|---|---|
| 6,834,370 | B1* | 12/2004 | Brandl | G05B 19/41865 715/201 |
| 6,909,934 | B1* | 6/2005 | Chang | G05B 19/41865 438/5 |
| 7,248,936 | B1* | 7/2007 | Holmes | G05B 19/41875 700/105 |
| 7,877,161 | B2* | 1/2011 | Tomoyasu | C23C 16/4405 216/59 |
| 9,116,770 | B2* | 8/2015 | Sheehan | G06F 8/60 |
| 2002/0183950 | A1* | 12/2002 | Fu | G06F 17/2211 702/84 |
| 2006/0015206 | A1* | 1/2006 | Funk | H01L 21/67253 700/121 |

(Continued)

*Primary Examiner* — Adam Lee
(74) *Attorney, Agent, or Firm* — Stephen Manetta; Susmita Bhandari

(57) ABSTRACT

An industrial control system includes a download verification subsystem to execute a verification test using the parameters stored in a configuration database before an execution subsystem downloads the recipe parameters to the input/output addresses of a piece of equipment to determine a first verification value. The download verification subsystem executes the verification test using the recipe parameters downloaded to the piece of equipment to determine a second verification value. The download verification subsystem compares the first and second verification values to determine whether the recipe parameters were downloaded to the input/output addresses of the piece of equipment successfully.

20 Claims, 30 Drawing Sheets

(56) References Cited

U.S. PATENT DOCUMENTS

| | | | |
|---|---|---|---|
| 2007/0141730 A1* | 6/2007 | Fujii | G05B 19/048 |
| | | | 438/5 |
| 2007/0152048 A1* | 7/2007 | Jung | G06Q 10/087 |
| | | | 235/385 |
| 2007/0231930 A1* | 10/2007 | Funk | H01L 22/12 |
| | | | 438/14 |
| 2008/0306615 A1* | 12/2008 | Morisawa | C23C 16/52 |
| | | | 700/18 |
| 2013/0253684 A1* | 9/2013 | Rudnick | G05B 19/056 |
| | | | 700/106 |
| 2013/0282169 A1* | 10/2013 | Moore | G07F 7/00 |
| | | | 700/235 |
| 2014/0058551 A1* | 2/2014 | Morinaga | G06F 17/50 |
| | | | 700/121 |

* cited by examiner

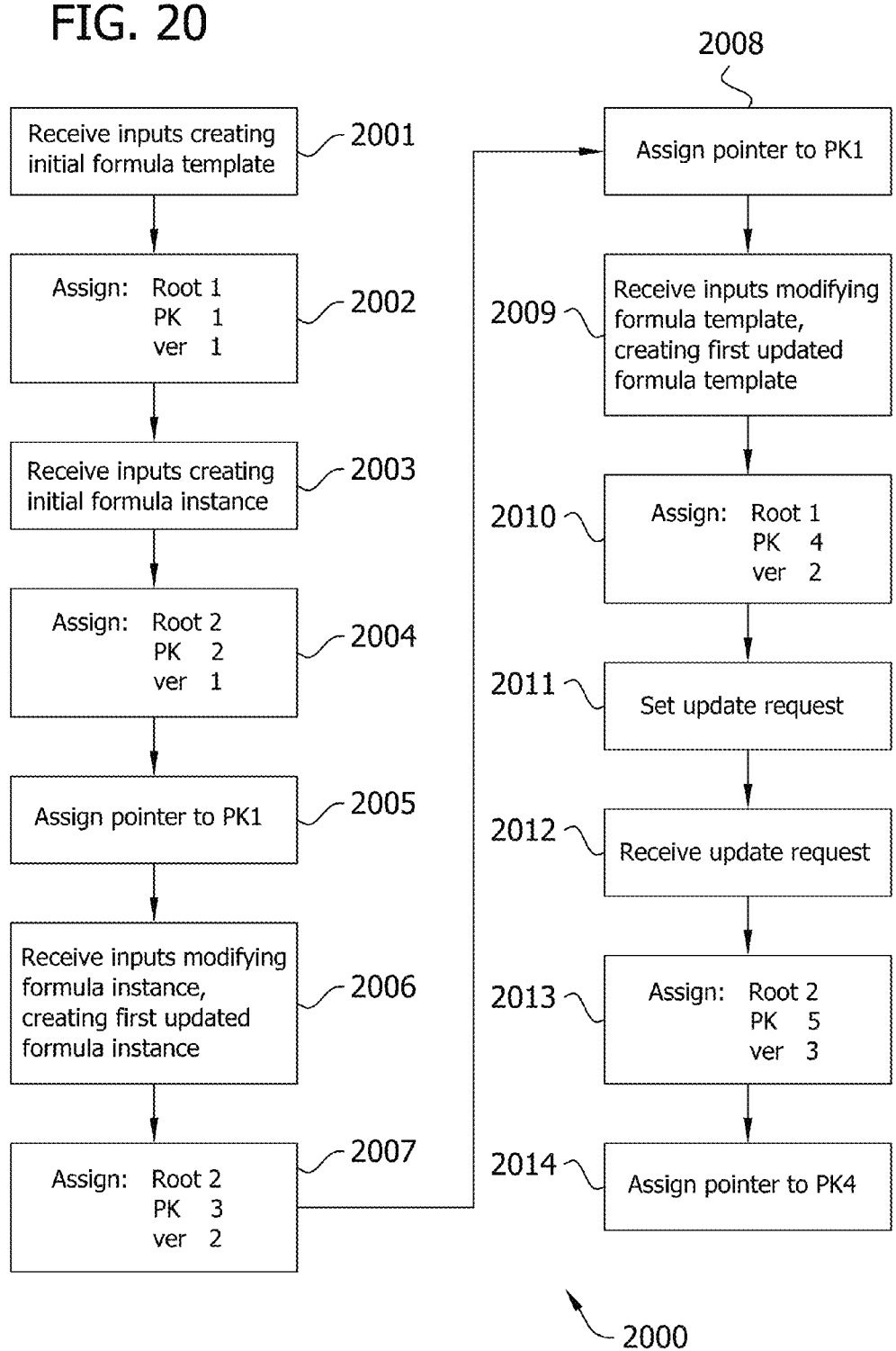

PARAMETER DOWNLOAD VERIFICATION IN INDUSTRIAL CONTROL SYSTEM

CROSS REFERENCE TO RELATED APPLICATIONS

This application claims the benefit of U.S. Provisional Application Ser. No. 61/974,895, filed on Apr. 3, 2014, the entire contents of which are hereby incorporated by reference. This application also claims the benefit of U.S. Provisional Application Ser. No. 61/890,800, filed on Oct. 14, 2013, the entire contents of which are hereby incorporated by reference.

BACKGROUND

The present invention generally relates to the field of networked computerized systems used to provide supervisory process control instructions to a process plant. More particularly, the present invention relates a system providing recipe management functionality in a process control environment.

Manufacturing industries build products according to repeatable procedures that use standardized quantities of raw materials. In essence, products are manufactured according to recipes. A recipe may describe the quantity of raw materials used and the way the materials are combined to create the final product. In one simple example, a process control entity such as an industrial bakery may follow a basic recipe that lists all the ingredients and procedural steps needed to make cookies. In such an example, the recipe may define the amounts of particular ingredients, the quantity of time spent mixing the ingredients, and the time and temperature for baking. It should be understood that recipes may also be used to define other processes such as, for example, a sequence of on-off type operations of a single piece of equipment. For example, in the cookie making process discussed above, a recipe may be used to define the operations performed by the mixer alone. In such an example, the recipe may include a first mixing step where the mixer mixes a first group of ingredients for a first length of time and a second mixing step where the mixer mixes the first ingredients with a second group of ingredients for a second amount of time. Still other recipe types may also be used without departing from the scope of the present invention.

Products such as Wonderware's Recipe Manager assist in creating and organizing recipes used to run various processes. As shown and discussed therein, prior recipe management systems relied on spreadsheet-based user interfaces in which users could define and create recipe templates. Although helpful for creating a set of instructions (recipe) for running a supervisory control routine, the grid-based recipe configuration systems are not very user-friendly. Accordingly, a more user-friendly system for recipe configuration is desired.

Recipe management systems have long used recipe templates to simplify the recipe creation process. With a recipe template, a user could, for example, define a common set of parameter types and default parameter values that may be used by any one of a number of pieces of equipment or lines of equipment located throughout the process facility. In the cookie-making process example, a standardized cookie-making template could be created for subsequent instantiation with instance-specific parameters and operations for, for example, peanut butter, chocolate chip, and oatmeal raisin cookies. However, using templates to instantiate similar recipes has the potential for problems. For example, changes in templates may make instances thereof obsolete. As a result changes to a template require a user to make corresponding changes in all instances that depend therefrom. Other recipe items that have dependencies may similarly become obsolete when changes are made to the items on which they depend. Accordingly, a versioning system that accounts for dependencies is desired.

Prior recipe management systems have used application-specific execution engines to execute control recipes in a process plant. These application-specific execution engines are either incompatible with system platforms or are unable to be hosted as a standalone executable. Execution engines pass recipes through multiple communication layers, which can cause a loss in data integrity. Additionally, during runtime these execution engines host the entire equipment model that is stored in the configuration database. As a result, configuration tools may not access the equipment model during runtime without adversely affecting the runtime system.

SUMMARY

In one aspect, an industrial control system executes a recipe on a piece of equipment in a process plant by operating the piece of equipment in accordance with parameters of the recipe. The piece of equipment comprises input/output addresses for communication with the industrial control system. The industrial control system comprises a recipe configuration subsystem configured to create a recipe model representing the recipe in response to user inputs. The recipe model comprises recipe parameters representing the parameters of the recipe and being stored in a configuration database. The recipe configuration subsystem is configured to map the recipe parameters to the input/output addresses of the piece of equipment. The industrial control system further comprises a recipe execution subsystem in communication with the recipe configuration subsystem and the piece of equipment and configured to download the recipe parameters to the input/output addresses of the piece of equipment. The recipe execution subsystem is further configured to execute the recipe on the piece of equipment by operating the piece of equipment in accordance with the downloaded recipe parameters. The industrial control system further comprises a download verification subsystem configured to execute a verification test using the recipe parameters stored in the configuration database before the recipe execution subsystem downloads the recipe parameters to the input/output addresses of the piece of equipment to determine a first verification value. The download verification subsystem is also configured to execute the verification test using the downloaded recipe parameters to determine a second verification value. In addition, the download verification subsystem is configured to compare the first and second verification values to determine whether the recipe parameters were downloaded to the input/output addresses of the piece of equipment successfully. The download verification subsystem is further configured to provide an indication of parameter download failure when the download verification subsystem determines the recipe parameters were not downloaded successfully.

In another aspect, an industrial control system executes a recipe on a piece of equipment in a process plant by operating the piece of equipment in accordance with parameters of the recipe. The piece of equipment comprises input/output addresses for communication with the industrial control system. The industrial control system is configured to store a recipe model representing the recipe in response to user inputs. The recipe model comprises recipe parameters representing the parameters of the recipe and being stored in a configuration database. The industrial control system is also configured to map the stored recipe parameters to the input/output addresses of the piece of equipment. The industrial control system is further configured to store a verification test for determining a verification value using the recipe parameters and execute the verification test using the stored recipe parameters to determine a first verification value. In addition, the industrial control system is configured to download the recipe parameters to the input/output addresses of the piece of equipment. The industrial control system is also configured to execute the verification test using the stored recipe parameters to determine a second verification value and compare the first verification value to the second verification value to determine whether the recipe parameters were downloaded to the input/output addresses of the piece of equipment successfully. The industrial control system is configured to provide an indication of parameter download failure when the industrial control system determines the recipe parameters were not downloaded to the input/output addresses of the piece of equipment successfully. In addition, the industrial control system is configured to execute the recipe on the piece of equipment by operating the piece of equipment in accordance with the downloaded recipe parameters.

Other aspects will be in part apparent and in part pointed out in the description and claims.

BRIEF DESCRIPTION OF THE DRAWINGS

FIG. 20 is a flowchart of the steps of a versioning method;

Corresponding parts are given corresponding reference numbers throughout the drawings and description.

DETAILED DESCRIPTION

Figure 1:
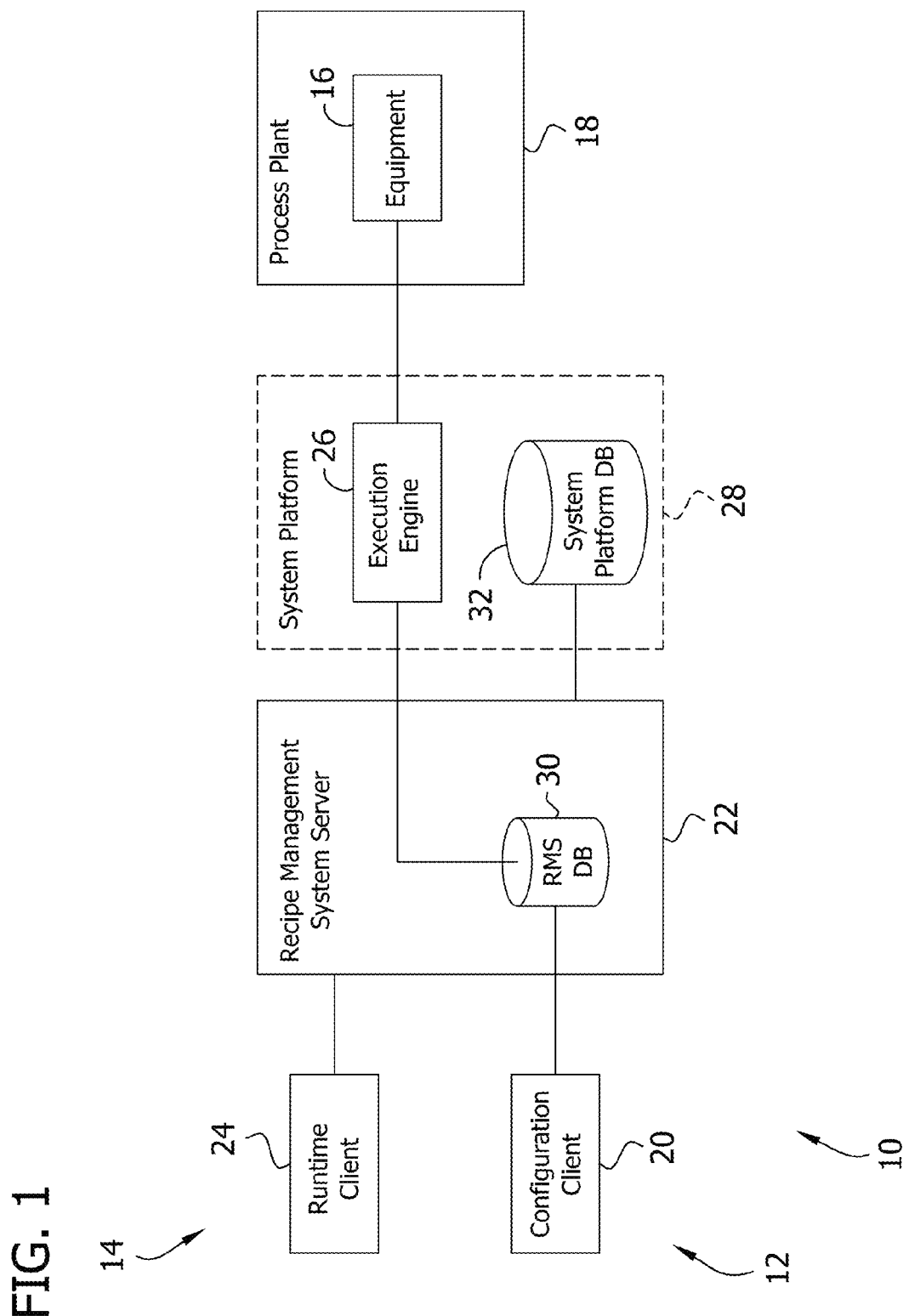
FIG. 1 is a block diagram of a recipe management system.

Referring to FIG. 1, a recipe management system (broadly, an industrial control system) is illustrated schematically and generally indicated at reference number 10. The illustrated recipe management system 10 includes a configuration system 12 and an execution system 14. The recipe management system 10 and, in the illustrated embodiment, the execution system 14 are configured to execute one or more recipes on equipment 16 in a process plant 18. Preferably, the equipment 16 includes several "pieces of equipment." Throughout the present disclosure and claims, it will be understood that a "piece of equipment" can include one or more apparatuses that perform a function in the process plant 18. Thus, a "piece of equipment" can, for example, include a single machine (e.g., an oven) that has one or more discrete capabilities (e.g., heating, holding, etc.) or a "piece of equipment" can include a connected sequence of machines (e.g., an assembly line) that each have their own capabilities that operate together to carry out one or more tasks. In some embodiments, the equipment 16 of the process plant 18 includes multiple pieces of equipment that perform the same tasks. Preferably, the pieces of equipment in the process plant 18 have capabilities that can be used to carry out a recipe. For example, the equipment 16 can perform one or more operations according to its capabilities to transform an input (e.g., raw materials) into an output (e.g., processed materials). In a preferred process plant 18, each of the pieces of equipment 16 upon which the recipe management system 10 is capable of executing a recipe has local control (e.g., a local controller, a distributed control network, etc.). In such a process plant 18, the recipe management system 10 communicates with the local control for a piece of equipment 16 to execute a recipe thereupon.

In the illustrated embodiment, the recipe management system 10 executes one or more recipes on the equipment 16. A recipe can, for example, be executed by utilizing a single capability of a piece of equipment 16 according the constraints of certain parameters. The combination of parameters that define how a recipe uses a capability of the piece of equipment 16 is called a formula. A formula is broadly understood to be an aspect of a recipe. In some embodiments a recipe can be defined at least in part by a formula that defines the parameters for using a capability of a piece of equipment 16 in accordance with the recipe. A formula can be a constituent member of a formula class. A formula class defines certain characteristics that are shared among the members of the class. A formula class is broadly understood to be an aspect of a recipe class (e.g., a type of recipe with certain characteristics that are shared by a plurality of recipes). For example, each of the formulas in a formula class can be defined by the same types of parameters. Thus, a formula class can, for example, include formulas for different recipes that are executable on an oven. Each of the formulas in the formula class might, for example, be defined by two kinds of parameters: time and temperature. In some cases each of the formulas in the formula class might have different values for each of the parameters, but in other cases each of the formulas in the formula class might have the same values for one or more parameters. As will be discussed in greater detail below, pieces of equipment 16, recipes, formula classes, formulas, and formula parameters are each entities in the process plant 18 that can be modeled in the recipe management system 10. It will be understood that other recipe management systems can model other types of entities in a process plant without departing from the scope of the invention.

In the illustrated embodiment, the configuration system 12 includes a configuration client 20. The illustrated configuration client 20 is a web-based client that accesses web applications stored on a recipe management system server 22. As will be discussed in more detail below, using user interface tools of the configuration client 20, a user configures models used to execute recipes on the equipment 16 in the process plant 18. The configuration client 20 receives user inputs (e.g., to a web browser at a work station or other terminal) and communicates with the recipe management system server 22 to create and store models. The models are used by the execution system 14 to execute recipes on the equipment 16 in the process plant 18. As explained in greater detail below, depending on the hosting environment for certain aspects of the execution system 14, the models created with the configuration system 12 can be stored in either of the recipe management system database 30 or a system platform database 32.

The execution system 14 includes a runtime client 24 and an execution engine 26, which includes logic and a code base for executing a recipe on a piece of equipment 16 based on one or more of the models stored in one of the databases 30, 32. The runtime client 24 is preferably a web-based client that receives user inputs through a web browser and communicates with the recipe management system server 24 to call execution of recipes using the models created and stored with the configuration system 12. The execution engine 26 communicates with the equipment 16 to execute recipes thereupon. In the illustrated recipe management system 10, the execution engine 26 is configured to be run as either a standalone executable or as an executable that is hosted by a system platform 28. If the recipe management system 10 is configured so that the execution engine 26 is a standalone executable, the configuration system 12 stores the models it creates in the recipe management system database 30. In the illustrated embodiment the recipe management system database 30 is shown local to the recipe management system server 22. It will be understood that in other embodiments the recipe management system database can reside remote from the recipe management system server without departing from the scope of the invention. If the recipe management system 10 is configured so that the execution engine 26 is to be hosted in the system platform 26, the configuration system 12 stores the models it creates in a system platform database 32. Preferably, the execution engine 26 can run as a standalone executable hosted in a Microsoft Windows hosting environment. In a preferred embodiment, the system platform 28 is a Wonderware system platform. In the illustrated embodiment, the execution engine 26 uses the same logic and code base whether operating as a standalone executable or hosted by a system platform.

Figure 2:
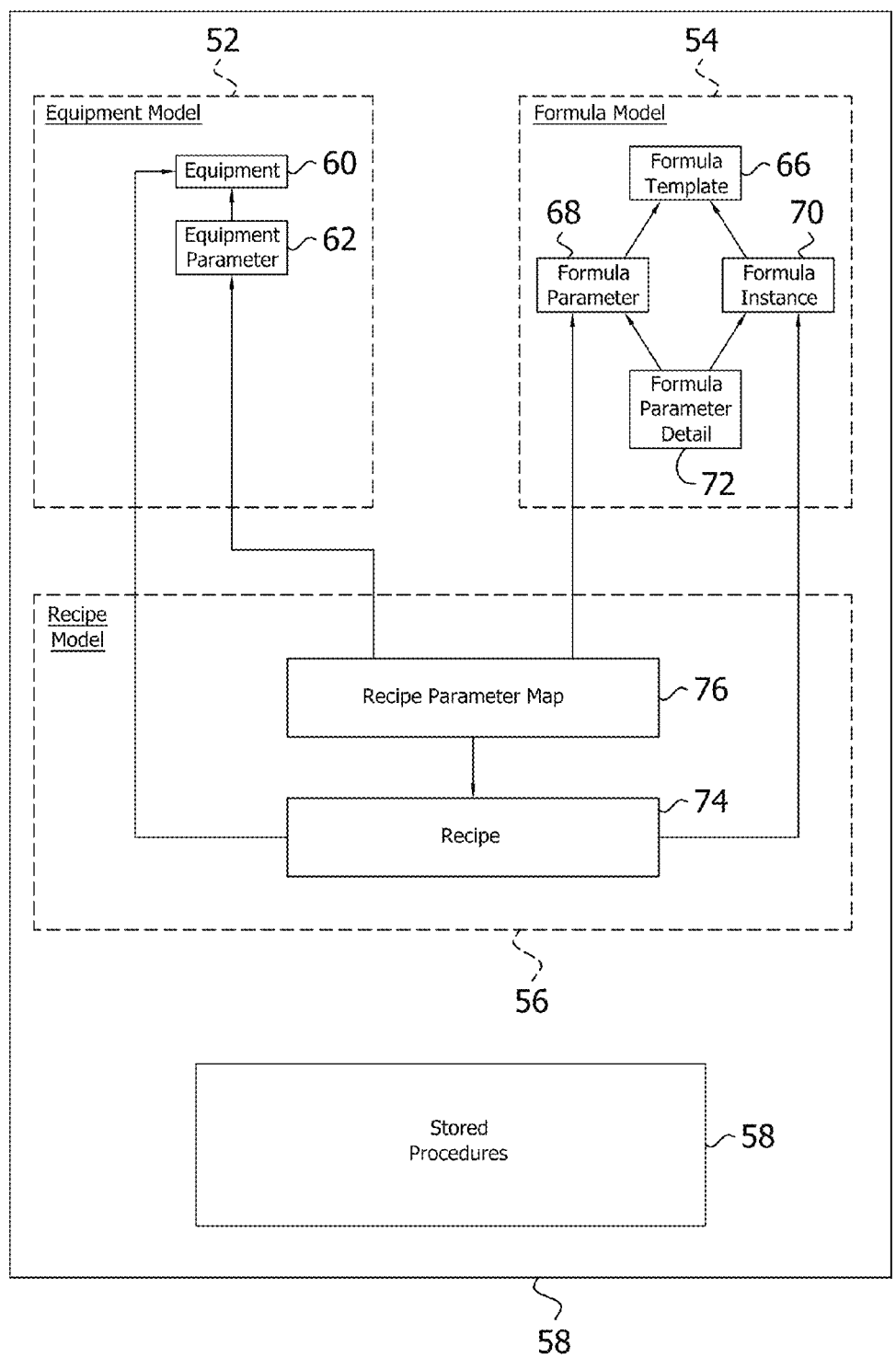
FIG. 2 is a block diagram of contents of a configuration database for of the recipe management system.

FIG. 2 depicts an exemplary embodiment of a recipe management system configuration database 50. It will be understood that the configuration database 50 can be stored on the recipe management system database 30 or the system platform database 32 of the recipe management system 10 of FIG. 1. As shown in the illustrated embodiment, the configuration database 50 includes equipment models 52, formula models 54, recipe models 56, and stored procedures 58. Each equipment model 52 represents a piece of equipment 16 in the process plant 18. The formula models 54 represent formula classes and instances of the formula classes that are used in recipes and executed on the equipment 16 in the process plant 18. And the recipe models 56 represent the recipes that are executed on the equipment 16 in the process plant 18. The equipment, formula, and recipe models 52, 54, 56 are each shown in phantom because in the illustrated embodiment the recipe management system 10 does not store these models as distinct records in the configuration database 50. Rather, the equipment model, formula model, and recipe model 52, 54, 56 are each defined by associations between lower level records that are stored in the configuration database 50. However, it will be understood that the equipment models 52, formula models 54, and recipe models 56 can be stored as distinct records in a recipe management system without departing from the scope of the invention.

In the illustrated embodiment, the equipment model 52 includes an equipment record 60 and an equipment parameter record 62. The equipment record 60 includes data that pertains to aspects of the piece of equipment represented by the equipment model 52 as a whole. The equipment parameter record 62 contains data that pertains to a particular parameter of the piece of equipment that is relevant to carrying out a recipe thereupon (e.g., temperature or time in the case of the oven). The equipment parameter record 62 is associated with the equipment record 60. It should be understood that other equipment models 52 may include one equipment record 60 that is associated with many equipment parameter records 61 (e.g., an equipment parameter record for time and another for temperature). In some embodiments, it is also possible for an equipment model 52 to have an equipment record 60 with which zero equipment parameter records 62 are associated. Though the illustrated embodiment uses an equipment model 52 that includes an equipment record 60 and equipment parameter record 62, it will be understood that other types of equipment models, which are defined by different or additional records in a configuration database, can also be used without departing from the scope of the invention.

The formula model 54 includes a formula template record 66, formula parameter record 68, formula instance record 70, and formula parameter detail record 72. The formula template record 66 represents aspects of a formula class (e.g., cookie making recipes). The formula instance record 70 represents aspects of a particular formula within a formula class (e.g., oatmeal raisin cookie making recipe). The formula parameter records 68 represent the kind of parameters that are used in a formula class, and the formula parameter detail records 72 represent values for the kind of parameters in a formula class or a formula within the formula class. For each complete formula model 54 in the illustrated embodiment, at least one formula parameter record 68 is associated with one formula template record 66. Likewise, at least one formula instance record 70 is associated with the formula template record 66. In addition, at least one formula parameter detail record 72 is associated with each formula parameter record 68. In some formula models 54, a formula parameter detail record 72 is also associated with a formula instance record 70.

Figure 3:
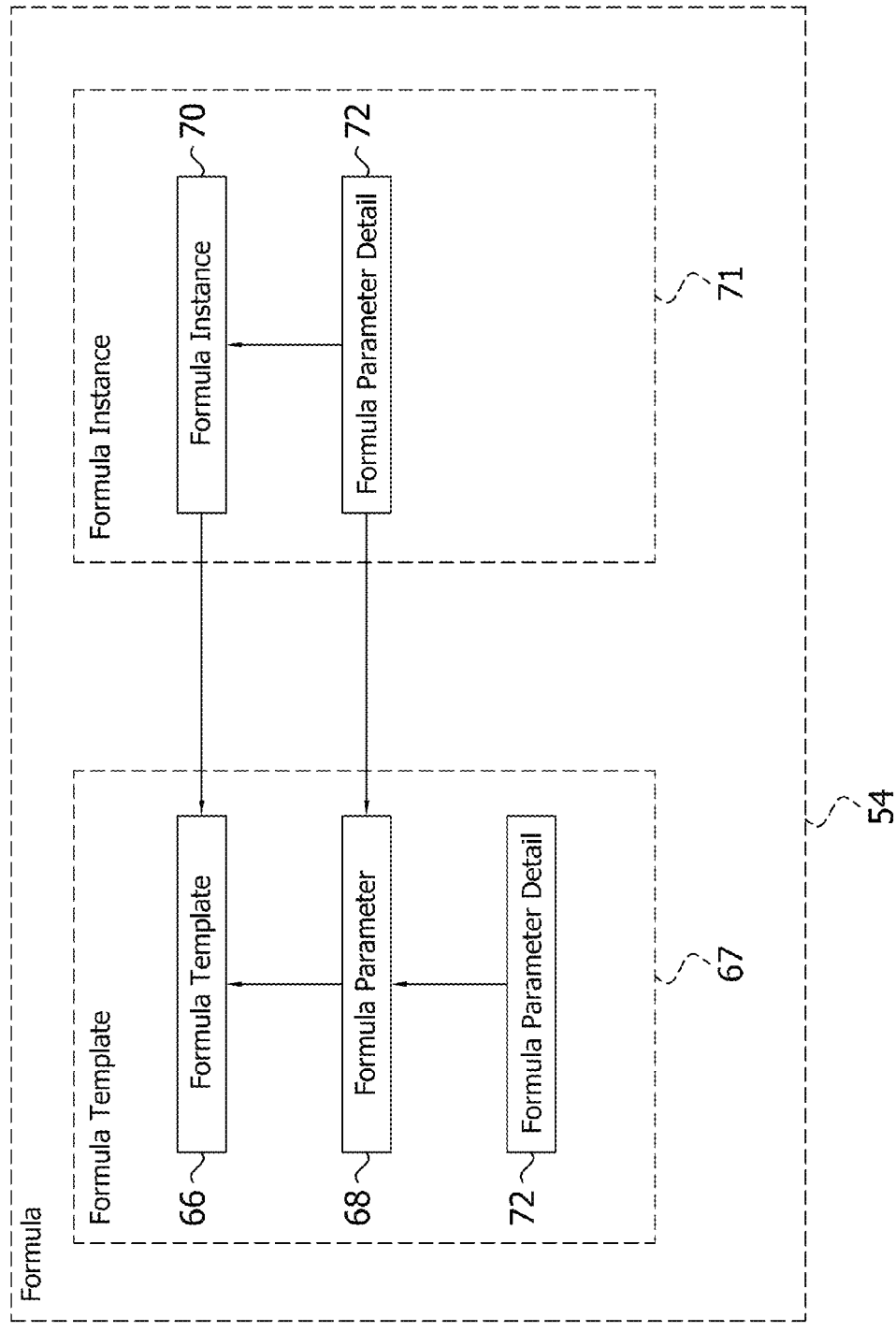
FIG. 3 is a block diagram of a formula model.

As shown in FIG. 3, the recipe management system 10 (FIG. 1) uses and presents the formula model 54 as two models: a formula template model 67 and a formula instance model 71. The formula template model 67 represents a formula class (i.e., an aspect of a recipe class), and the formula instance model 71 represents a member of the formula class (i.e., an aspect of a recipe). In the illustrated embodiment, the formula template model 67 includes the information stored in the formula template record 66, its associated formula parameter record(s) 68, and those of the formula parameter detail records 72 that are not directly associated with a formula instance record 70. As will be discussed in greater detail below, a formula parameter detail record 72 can be part of a formula template model 67, a formula instance model 71, or both, depending on whether or not it has an association with a formula instance record 70. The formula instance model 71 includes the information stored in the formula instance record 70, as well as its associated formula parameter record(s) 68 and formula parameter detail record(s) 72. As is illustrated, each formula instance record 70 is associated with one parent formula template record 66. The formula parameter records 68 that are included in a formula instance model 71 are those formula parameter records that are associated with the formula template record 66 with which the respective formula instance record 70 is also associated. Likewise, the formula parameter detail records 72 that are included in a formula instance model 71 by default include those formula parameter detail records that are associated with the formula template record 66 (e.g., by association with a respective formula parameter record 68) with which the formula instance record 70 is associated. In addition, certain formula parameter detail records 72 are directly associated with a formula instance record 70 and a formula parameter record 68. These formula parameter detail records 72 are also included in the respective formula instance model 71.

As discussed above, the formula template model 67 represents a formula class (i.e., an aspect of a recipe class), and the formula instance model 71 represents a member of the formula class (i.e., an aspect of a recipe). In the illustrated embodiment, a formula parameter record 68 can be understood to represent a kind of formula parameter (e.g., for an oven, there might be a kind of formula parameter for time and another kind of formula parameter for temperature, each represented by a respective formula parameter record 68). A formula parameter detail record 72 can be understood to represent one or more values for a kind of formula parameter. For certain parameters in a formula class, the parameter value might be standard among several members of the class. A formula parameter detail record 72 that is not directly associated with a formula instance record 70 represents the standard parameter value for the formula class. A formula parameter detail record 72 that is directly associated with a formula instance record represents the parameter value(s) for a member of the formula class.

In the illustrated embodiment, the formula parameter detail record 72 can be used in two ways: as a default formula parameter detail record or an override formula parameter detail record. A default formula parameter detail record 72 is directly associated with a formula parameter record 68, but not a formula instance record 70. An override formula parameter detail record 72 is directly associated with a formula parameter record 68 and a formula instance record 70. For example, the override formula parameter detail record 72 can have a pointer that points directly to a formula instance record 70. Whenever an override formula parameter detail record 72 is associated with a formula instance record 70, the respective formula instance model 71 includes the override formula parameter detail record and the respective default formula parameter detail record (i.e., the formula parameter detail record that is associated with the formula parameter record 68 with which the override formula parameter detail is also associated) is overridden by the override formula parameter detail record in the formula instance model. Thus, in the illustrated system 10, a formula instance model 71 is presumed to have the parameter values of its formula template model 67 unless they are overridden with an override formula parameter detail record 72.

Though the illustrated recipe management system 10 uses associated formula template records 66, formula parameter records 68, and formula parameter detail records 72 to create a formula template model 67 and associated formula instance records 70, formula parameter records 68, and formula parameter detail records 72 to create a formula instance model 71, it will be understood that other embodiments can create and store formula template and formula instance models differently without departing from the scope of the invention.

Referring again to FIG. 2, the recipe model 56 is used to represent a recipe that can be executed in the process plant 16. It maps the formula model 54 to the equipment model 52 and, more specifically, maps the data contained in equipment parameter records 62 to the data contained in formula parameter and detail records 68, 72 of a formula instance model 71. The illustrated recipe model 56 includes a recipe record 74. A recipe parameter map record 76 is associated with the recipe record 74 in the recipe model 56. Additionally, the recipe parameter map record 76 is associated with an equipment parameter record 62 of the equipment model 52 and a formula parameter record 68 of the formula model 54. The recipe record 74 is likewise associated with the equipment record 60 of the equipment model 52 and the formula instance record 70 of the formula model 54. It will be understood that the illustrated recipe model 56 (including both the recipe record 74 and the recipe parameter map record 76) point to aspects of the equipment model 52 and formula model 54 that provide data used to carry out a recipe on a piece of equipment 16 in a process plant 18. Though the illustrated recipe model 56 includes a recipe record 74 and a recipe parameter map record 76 that maps a formula model 54 to an equipment model 52, it will be understood that other recipe models can include data organized in other ways without departing from the scope of the invention.

Though the illustrated configuration database 50 includes three types of models 52, 54, 56, it should be understood that other configuration databases store other types of models. For example, some configuration databases store site models. The various records in the equipment and formula models 52, 54 can point to respective site models to associate the records with a particular site (e.g., a geographical location where process plant activities occur). Likewise, some configuration databases also store models representing other aspects of recipes and recipe classes besides formulas. For example, a configuration database can store procedure models containing procedure records and operation records. In these embodiments, the equipment model also contains equipment operations records. These and other models can be configured by a configuration system 12 and used by an execution system 14 of a recipe management system 10 to run recipes on equipment 16 in a process plant 18. In addition to the models discussed above, the configuration database 50 contains stored procedures 58 used in configuring the various models and executing control recipes at runtime.

In certain embodiments, records are stored in an SQL database. In some embodiments, the configuration database 50 is configured and operated on using an object relational mapping framework. Other ways of grouping record data (e.g., as objects in an object oriented database) may also be used without departing from the scope of the invention. Likewise, other techniques for configuring and operating upon the data can be used without departing from the scope of the invention.

Figure 4:
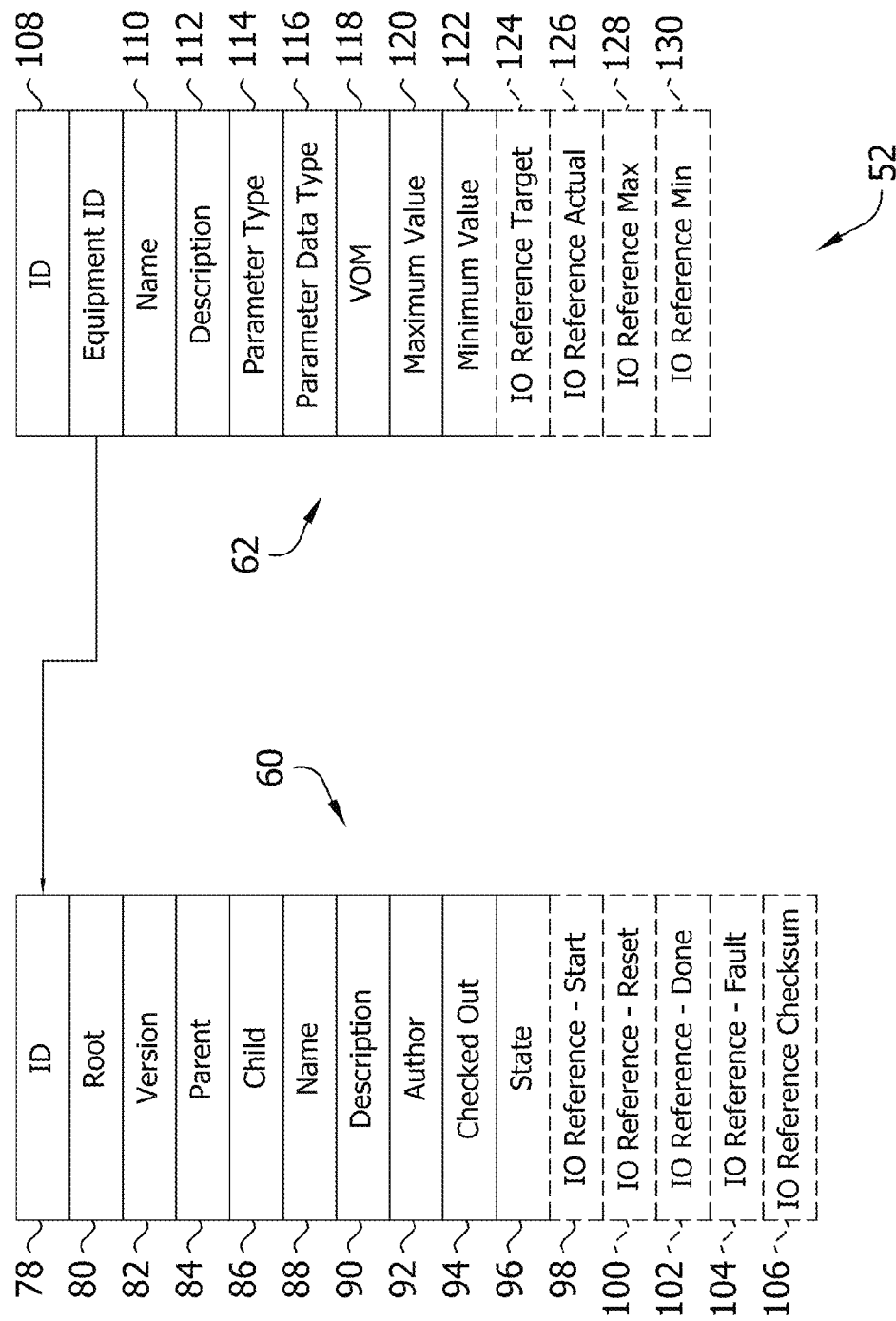
FIG. 4 is a block diagram of an equipment model.
Figure 6:
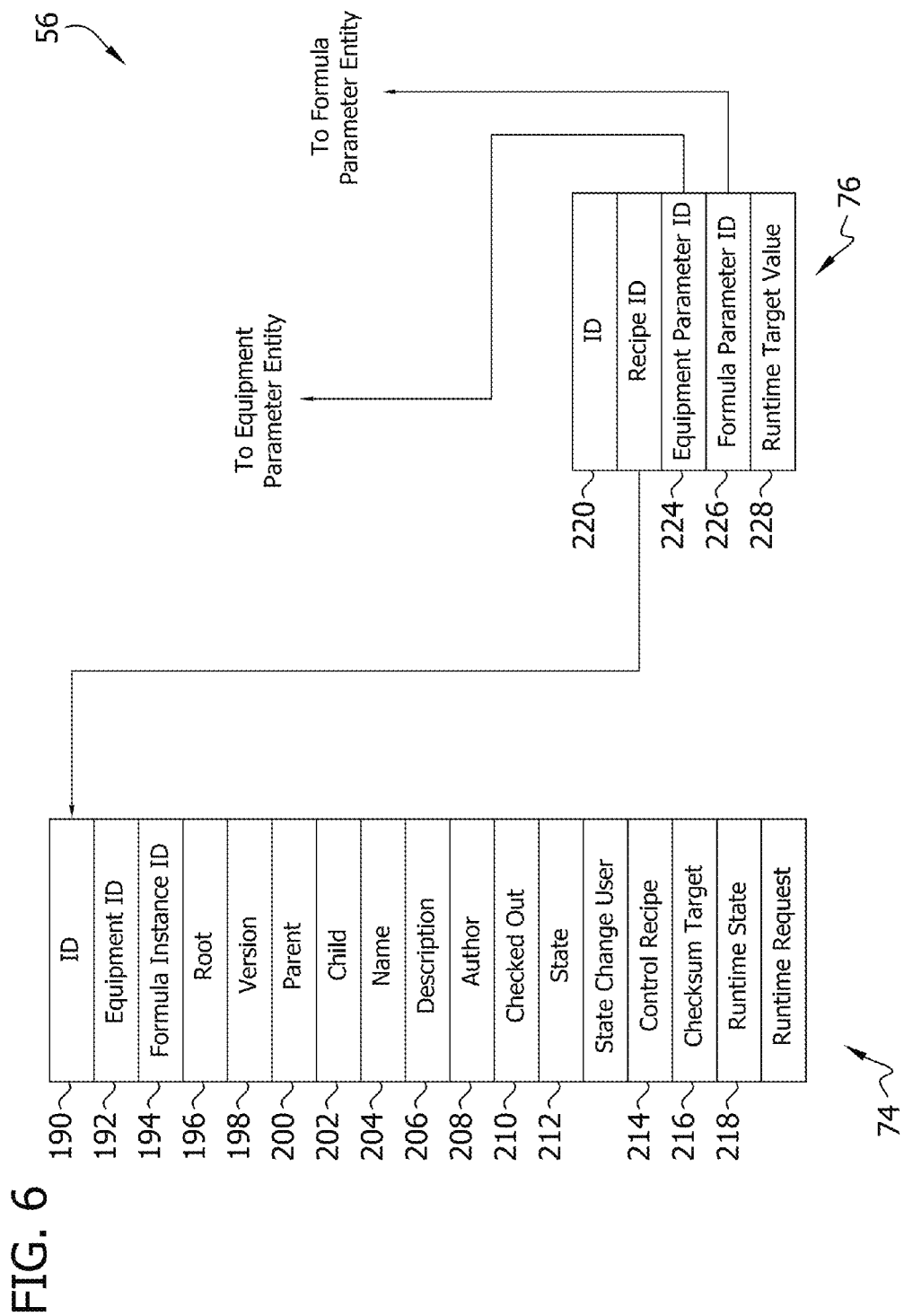
FIG. 6 is a block diagram of a recipe model.

FIG. 4 depicts certain aspects of the equipment model 52 in greater detail. It should be understood that the features of the equipment model 52 shown in FIG. 6 are not necessarily representative of all of the data used to represent an equipment model. Rather, they point out certain aspects of the model 52 that, in this embodiment, enable some of the features of the recipe management system 10 discussed in greater detail below. It should also be understood that certain aspects of the illustrated equipment model 52 (e.g., data fields) may be removed without departing from the scope of the invention. The equipment record 60, like all other records in the configuration database 50, includes a unique primary key identifier 78 (labeled ID). In addition, like all versioned records on the configuration database 50, the equipment record 60 includes a root identifier 80 and version identifier 82. The primary key identifier 78 is a unique identifier for a particular equipment record. It distinguishes that equipment record 60 from all other versions of all other records stored in the configuration database, including earlier or later versions of the same equipment record. The illustrated recipe management system uses an SQL database wherein the primary key for each record is an integer. However, it should be understood that other primary key identifiers may also be used to distinguish records stored in the configuration database without departing from the scope of the invention. The primary key identifier 78 is a system-assigned field of the configuration database.

The equipment record 60 is versioned. In some cases, records (e.g., an equipment record 60) may need to be changed. For example, changes in the process plant may make data in a record obsolete, or a user may later discover an error in a model. When changes are made to a preexisting equipment record 60, which represents a particular piece of equipment 16, a new version of the equipment record, which represents the same particular piece of equipment, is created. The recipe management system 10 maintains a version history for each versioned model in the system. Associations between multiple versions of the same model (i.e., that represent the same entity in the process plant 18) are maintained in the configuration database 50. In the illustrated embodiment, each time a new equipment record 60 representing a new piece of equipment 16 is saved to the system, it is given a root identifier 80. Subsequent versions of the equipment record for the same piece of equipment 16 have the same root identifier 80. Equipment records 60 that represent different pieces of equipment have different root identifiers. Like primary key identifiers, root identifiers may be assigned automatically by the recipe management system (i.e., the user does not have to define and track the root identifiers 80 for each equipment record 60). Every version of an equipment record 60 also has a version identifier 82. The version identifier 82 distinguishes one version of an equipment record from all other versions of the same record. The version identifier 82 increments sequentially after each new version of an equipment record 60 (i.e., each new record 60 with the same root identifier 80) is created. Like the primary key 78 and root identifier 80, the version identifier 82 is automatically assigned by the recipe management system. Unlike the version identifier 82, the primary key identifier 78 does not necessarily increment sequentially with each change in the version of a specific type of equipment record 60. Rather, in a preferred embodiment, the primary key identifiers 78 increment sequentially for each new version of any record of any type that is saved to the configuration database. Thus, as modifications are made to a particular equipment record 60 representing a particular piece of equipment (or other versioned records), new versions of the particular record will be created, each new version having the same root identifier 80 as prior versions and new primary key and version identifiers 78, 82.

In addition to the primary key, root, and version identifiers 78, 80, 82, the equipment record 60 includes parent and child identifier fields 84, 86. The parent identifier field 84 contains a foreign key that associates the equipment record 60 with its parent equipment record. A parent equipment record 60 is the record that represents the immediately prior version of the equipment record in the configuration database. The child identifier field 86 contains a foreign key that associates the equipment record 60 with its child equipment record. A child equipment record 60 is the record that represents the immediately subsequent version of the equipment record in the configuration database. If no prior version of an equipment record 60 exists, the parent identifier field 84 can be set to NULL. If no subsequent version of an equipment record 60 exists, the child identifier field 86 can be set to NULL. As discussed below, the equipment record 60 is but one example of a versioned record in the illustrated recipe management system. Other versioned records also have fields for primary key, version, and root identifiers that function as described above. Likewise, other records have fields for parent and child identifiers that function as described with respect to the equipment record 60. Non-versioned records (e.g., in some embodiments, site records) lack root and version identifiers and parent and child fields.

The name field 88 and the description field 90 are user-defined fields that identify and describe the record 60. The name field 88 must be unique among all current versions of records in the system, but can be the same among different versions of the same record (e.g., records that share a root identifier). An author field 92 specifies the user who is responsible for creating a version of the equipment record 60. In some embodiments, the recipe management system includes access routines that verify the identity and permissions of a user prior to permitting access/use of the system. In these embodiments, the recipe management system may automatically populate the author field 92 when an equipment record 60 is saved to the configuration database based on its knowledge of the identity of the user who made the changes. As will be discussed in greater detail below, records are committed to the configuration database using a check-in, check-out system. Before changes are made to a record, a user must check the record out of the configuration database. Checking out a record creates and saves a new, copied version of the record. When an equipment record 60 is checked out, a flag is set in the checked out field 94 of the record. This flag alerts the system that the user who checked out the record may edit it and no other user may access the record for editing purposes. A state field 96 is used to indicate the configuration state of the record. The illustrated recipe management system recognizes the following states: draft, approved, obsolete. Only approved equipment records 60 are used by the execution system 14 in the illustrated embodiment. At check out, the new record is placed in the draft state. A checked out record can either be committed or removed from the database. For example, user interface tools may allow an unwanted new version of a record to be removed prior to commitment. A checked out item may also be committed to the configuration database using check in tools. Commitment of the checked out object merely means it cannot be removed from the database using the removal tools that apply to a checked out object. As discussed above, an equipment record 60 is often only one constituent part of an equipment model 52. In certain embodiments, the equipment record 60 controls the checked in/out status for the entire equipment model 52. Thus, when an equipment record 60 is checked out, the entire equipment model 52 is considered checked out. Likewise, when a new, copied version of an equipment record 60 is created, new, copied versions of its associated equipment parameter records 62 are also created. When an equipment record 60 is checked in, the entire equipment model 52 is considered checked in. Similarly, the state field 96 of an equipment record 60 controls the state for the entirety of its respective equipment model 52 in the illustrated embodiment. Thus, whether an equipment model 52 is approved for use by the execution system 14 is determined by the state field 96.

When the recipe management system 10 is configured to run as a standalone executable (FIGS. 1 and 2), control system IO references (e.g., IO addresses for a piece of equipment 16) are maintained locally in the configuration database 50. When the recipe management system is configured to run hosted in a system platform, the IO references may be maintained in the system platform 28. The start, reset, done, and fault IO references fields 98, 100, 102, 104 store IO tags for reading/writing runtime states for the equipment to the IO layer of a piece of equipment 16 in the process plant 18. The IO reference checksum field 106 contains an IO tag for writing a checksum value used in a verification system of the recipe management system 10.

In addition to the equipment record 60, the illustrated equipment model 52 also includes an equipment parameter record 62. The equipment parameter record 62 includes fields 108, 110, 112 for primary key identifier, name, and description that operate as described above. The illustrated equipment parameter record 62 also has an equipment identifier field 109. The equipment identifier field 109 preferably stores an association to the equipment record 60 with which the equipment parameter record 62 is associated. For example, in some embodiments the equipment record 60 and the equipment parameter record 62 are stored in an SQL database. In these embodiments, the equipment identifier field 109 can be a foreign key identifier that contains the primary key identifier (originally stored in field 78 of the equipment record 60) for the equipment record 60. Each equipment parameter record 62 includes a parameter type field 114, which determines the type of parameter an equipment parameter record 62 represents. In preferred embodiments, the recipe management system is aware of at least input, output, and process variable parameter types 114, though other parameter types may also be used without departing from the scope of the invention. In some embodiments, only a process variable parameter type 114 is needed. A parameter data type field 116 identifies the data type for the parameter 62 (e.g., Boolean, string, integer, etc.). The unit of measure field 118 (labeled 'UOM') specifies the units of measure for the parameter. In some embodiments, the recipe management system stores unit of measure records (not shown) in the configuration database and the unit of measure field 118 is a foreign key associating the equipment parameter record 62 with the unit of measure record. The maximum and minimum value fields 120, 122 define a parameter range for the piece of equipment 16 represented by the equipment model 52. These fields may correspond, for example, to parameter values at which equipment failure would be expected. The equipment parameter record 62 includes IO reference fields 124, 126, 128, 130 that contain IO tags for particular values. The IO reference target field 124 contains the IO tag for the target value for a parameter. The IO reference actual field 126 contains the IO tag for reading an actual parameter value from the control system. The IO reference maximum and minimum fields 128, 130 contain IO tags for writing maximum and minimum parameter values to the IO layer of the piece of equipment 16.

Figure 5:
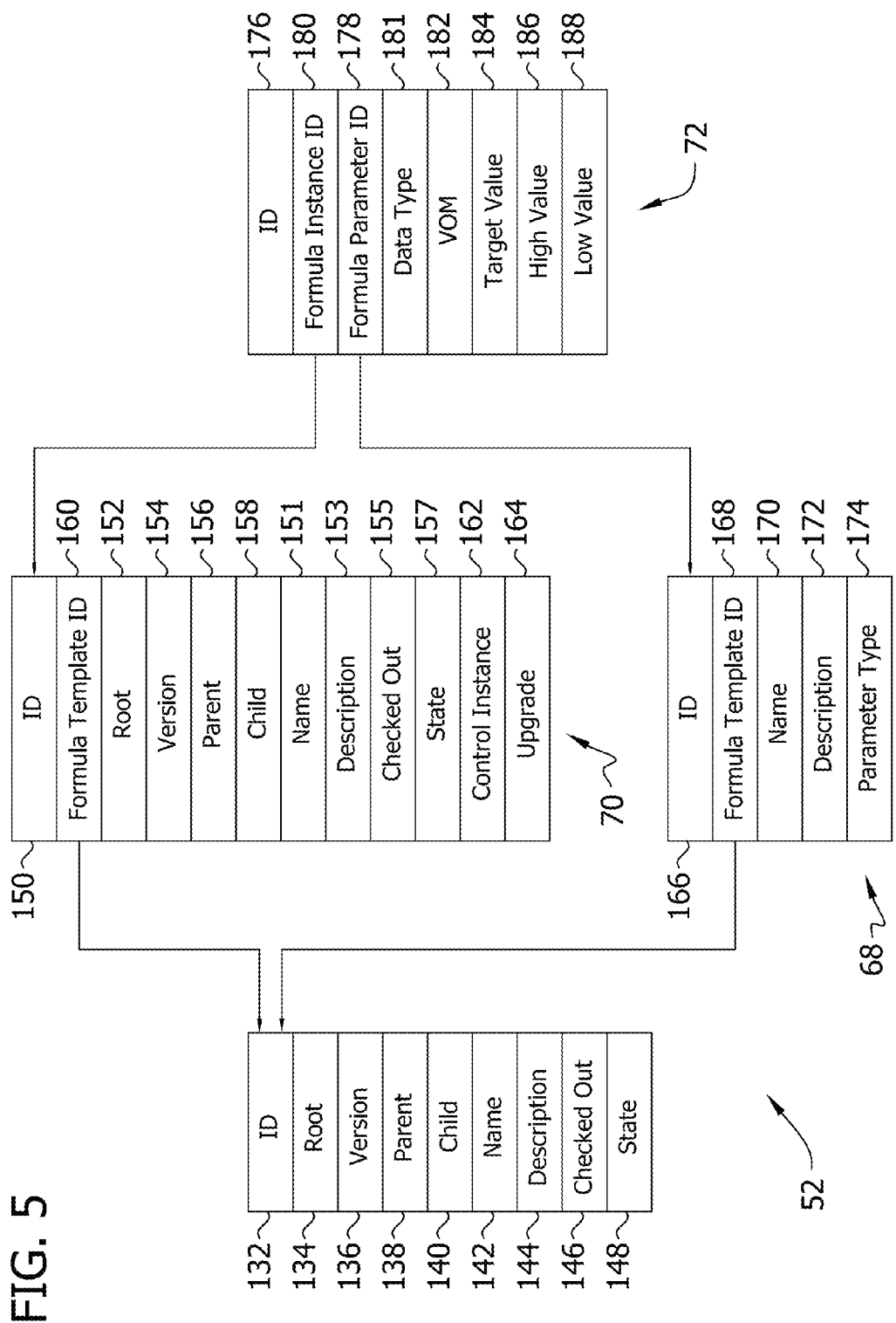
FIG. 5 is a block diagram providing an alternative representation of the formula model.

FIG. 5 depicts certain aspects of the formula model 54 in greater detail. It should be understood that the features of the formula model 54 shown in FIG. 5 are not necessarily representative of all of the data used to represent a formula model. Rather, they point out certain aspects of the model that, in this embodiment, enable some of the features of the recipe management system discussed in greater detail below. It should also be understood that certain aspects of the illustrated formula model 54 (e.g., data fields) may be removed without departing from the scope of the invention. The illustrated formula model 54 includes the formula template record 66, the formula instance record 70, the formula parameter record 68, and the formula parameter detail record 72.

The formula template record 66 is versioned. In the illustrated embodiment, each formula template record 66 includes primary key, root, version, parent, and child identifiers 132, 134, 136, 138, 140 that function as described above. The formula template record 66 also includes fields for name 142, description 144, checked out 146, and configuration state 148, each of which functions as described above with respect to the equipment model 52. In the illustrated embodiment, the checked out and configuration state fields 146, 148 control whether the respective formula template model 67 is checked out and control the configuration state of the formula template model.

The formula instance record 70 is also a versioned record. It has fields for primary key 150, root 152, version 154, parent 156, and child 158 that function as described above. Like the formula template record 66, the formula instance record 70 includes fields 151, 153, 155, 157 for a name, description, checked out, and state, which function as described above. In the illustrated embodiment, the checked out and configuration state fields 155, 157 control whether the respective formula instance model 71 (FIG. 3) is checked out and control the configuration state of the formula instance model. The formula instance record 70 also includes a formula template identifier field 160. This field associates the formula instance record 70 with its parent formula template record 66 using a foreign key identifier. As discussed in more detail below, the execution system 12 of the recipe management system 10 makes a copy of a formula instance model 71 that is used with a recipe model 56 in a control recipe. The control instance field 162 is used to indicate whether the formula instance record 70 is part of a control recipe. The upgrade field 164 is used to flag whether the parent formula template model 67 on which the formula instance model 71 is based has been updated.

As discussed above, formulas are aspects of recipes that describe the kinds of parameters in the recipes and their values. The formula parameter record 68 includes fields for a primary key identifier 166, name 170, and description 172, each of which functions as described above. It also includes a formula template identifier field 168 that associates the formula parameter record 68 with its parent formula template record 66 using a foreign key identifier. The parameter type 174 identifies the type of parameter (e.g., input, output, process variable) modeled in the record 68. In preferred embodiments, a formula instance model 71 (including a formula instance record 70 and its associated formula parameter and formula parameter detail records 68, 72) maps to an equipment model 52 (including an equipment record 60 and its associated equipment parameter records 62) in a control recipe such that each equipment parameter record 52 has a corresponding formula parameter record 68.

The formula parameter detail record 72 includes a field for a primary key identifier 176 that functions as described above. A formula parameter identifier field 178 associates the formula parameter detail record 72 with a formula parameter record 68, and a formula instance identifier field 180 associates override formula parameter detail records with a formula instance record 70 (e.g., using foreign key relationships). In preferred embodiments, each formula parameter record 68 will be associated with at least one formula parameter detail record 72. However, if the formula instance identifier field 180 of the formula parameter detail record 72 associates the formula parameter detail record with a formula instance record 70, the associated formula parameter record 68 will be associated with more than one formula parameter detail record (e.g., one default formula parameter detail record and at least one overriding formula parameter detail record that overrides the default formula parameter detail record for a formula instance model 71).

As will be discussed in greater detail below, when formula template models 67 are configured, the user supplies the necessary data for a formula template record 66 and its associated formula parameter records 68. In addition, the user supplies default values for each of the parameters represented in the formula template model 67. The default values are stored in default formula parameter detail records 72. However, because these values are not associated with any particular formula instance record 70, the formula instance identifier field 180 in such a record 72 is NULL. If, when configuring a formula instance model 71, the user decides to change any of the default values for a parameter, an overriding formula parameter detail record 72 will be created with a formula parameter identifier 176, which associates it with the same formula parameter record 68 as the default formula parameter detail record, and a formula instance identifier 180, which associates it with a formula instance record 70. For these formula instance records 70, the new formula parameter detail record 72 will override the default formula parameter detail record 72 and assign new values for the respective formula instance model 71.

In addition to the above-discussed fields, the formula parameter detail record 72 also includes a data type field 181 and a unit of measure field 182. These fields function as in the equipment parameter record 62 in that the data type field 181 defines the data type for the formula parameter and the unit of measure field 182 defines the unit of measure for the formula parameter. The formula parameter detail record 72 also includes a target value field 184, which sets the target value for the parameter it represents. The high and low value fields 186, 188 perform a similar function to the maximum and minimum value fields in the equipment parameter record 62. However, the high and low value fields set the applicable range for a formula, rather than a piece of equipment.

FIG. 6 depicts certain aspects of the recipe model 56 in greater detail. It should be understood that the features of the recipe model 56 shown in FIG. 6 are not necessarily representative of all of the data used to represent a recipe model. Rather, they point out certain aspects of the model 56 that, in this embodiment, enable some of the features of the recipe management system discussed in greater detail below. It should also be understood that certain aspects of the illustrated recipe model 56 (e.g., data fields) may be removed without departing from the scope of the invention. After its primary key identifier field 190, which functions as described above, the recipe record 74 includes two foreign key identifier fields: an equipment identifier 192 for identifying a particular equipment record 60 and a formula instance identifier 194 for identifying a particular formula instance record 70. These two fields are used to associate a recipe model 56 with a formula instance model 71 and an equipment model 52. In the illustrated embodiment, the recipe record 74 is versioned. Thus each recipe record 74 includes fields for root identifier 196, version identifier 198, parent identifier 200, and child identifier 202 that function as described with respect to other versioned records above. Likewise, the fields for name 204, description 206, author 208, checked out 210, and state 212 function as discussed above with respect to other record types. The checked out and state fields 210, 212 of a recipe record 74 are controlling for a recipe model 56. The control recipe field 214 specifies whether this recipe record is part of a control recipe. The checksum target value field 216 is used with the IO reference checksum field 106 of the associated equipment record 60 (FIG. 4) to enable a verification system that is discussed in greater detail below. It holds the verification value that, at run-time, is written to the IO tag reference stored in the IO reference checksum field 106 of the equipment record 60. A runtime state field 218 specifies the runtime state of a control recipe.

As will be discussed in further detail below, when a formula instance model 71 is loaded to an equipment model 52 to create a control recipe, recipe parameter map records 76 are created to map each of the equipment parameters 62 in the equipment model 52 to a formula parameter 68 of the formula instance model 71. The recipe parameter map record 76 includes a field for a primary key identifier 220, which is used as described above with respect to other records. A recipe identifier field 222 is populated with a foreign key identifier that associates the recipe parameter map record 76 with its respective recipe record 74. Likewise equipment parameter identifier and formula parameter identifier fields 224, 226 use foreign key relationships to create an association between the recipe parameter map record 76 and its respective equipment parameter record 62 and formula parameter record 68. The recipe parameter map record 76 also includes a runtime target value field 228. If a user chooses to change a parameter target from the value stored in the formula instance model 71 prior to execution, the new parameter target will be stored in this field and written to the corresponding IO reference tag during execution. If a parameter target is not changed, the field 228 will be NULL, and the parameter target value 184 stored in the formula parameter detail record 72 will be written to the IO reference tag. During execution, the configuration database stores control recipes that include one recipe record 74 that indicates the recipe model 56 is a control recipe and one recipe parameter map record 56 for each equipment parameter record 62 in a respective equipment model 52. The associations made by the recipe parameter map records 76 allow values maintained in formula instance model 71 to be written to the control system using tag references maintained in the equipment model 52.

Figure 7:
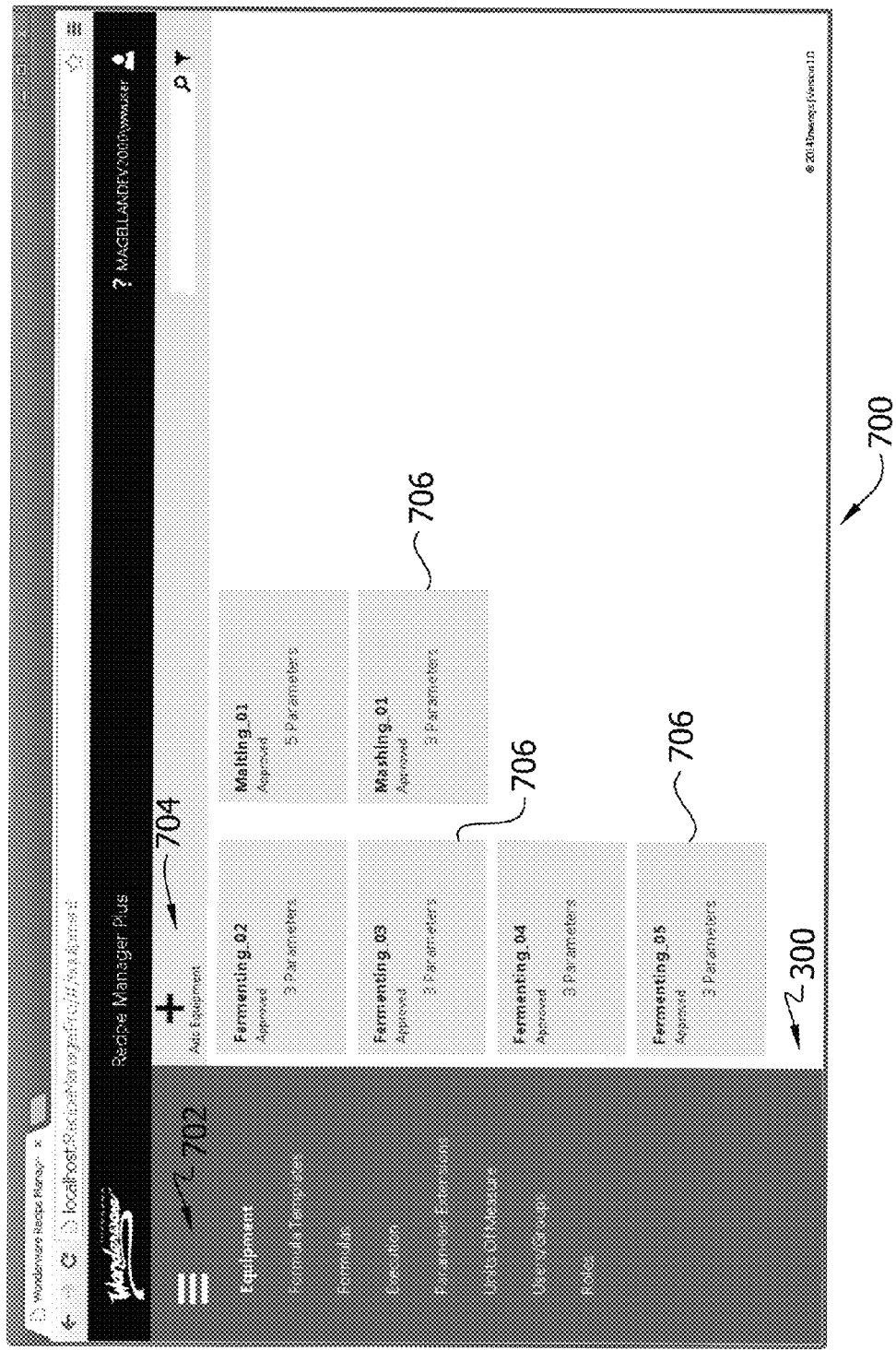
FIG. 7 is a screenshot of an equipment tiles view with a main menu open.
Figure 8:
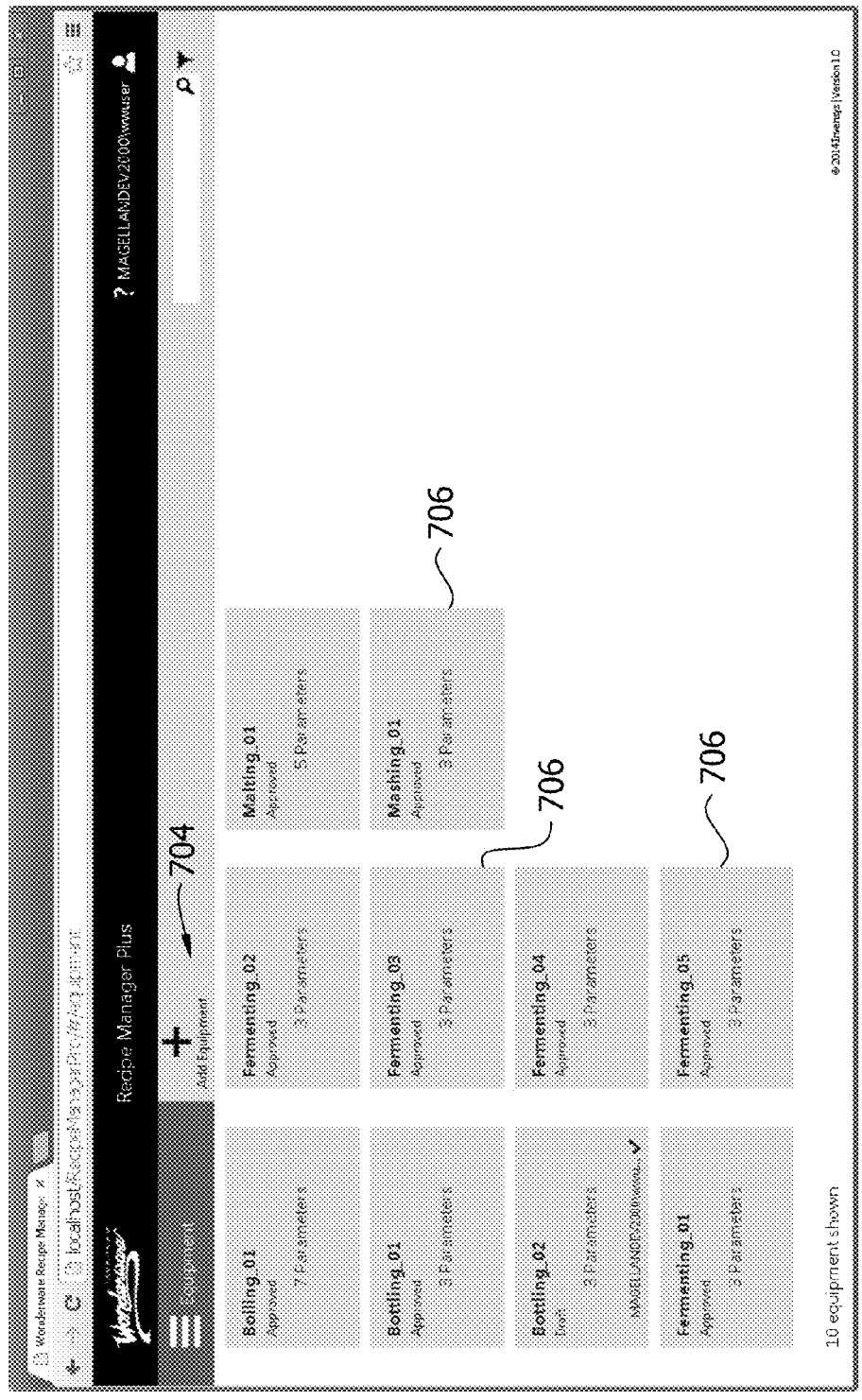
FIG. 8 is a screenshot of the equipment tiles view without the main menu.
Figure 9:
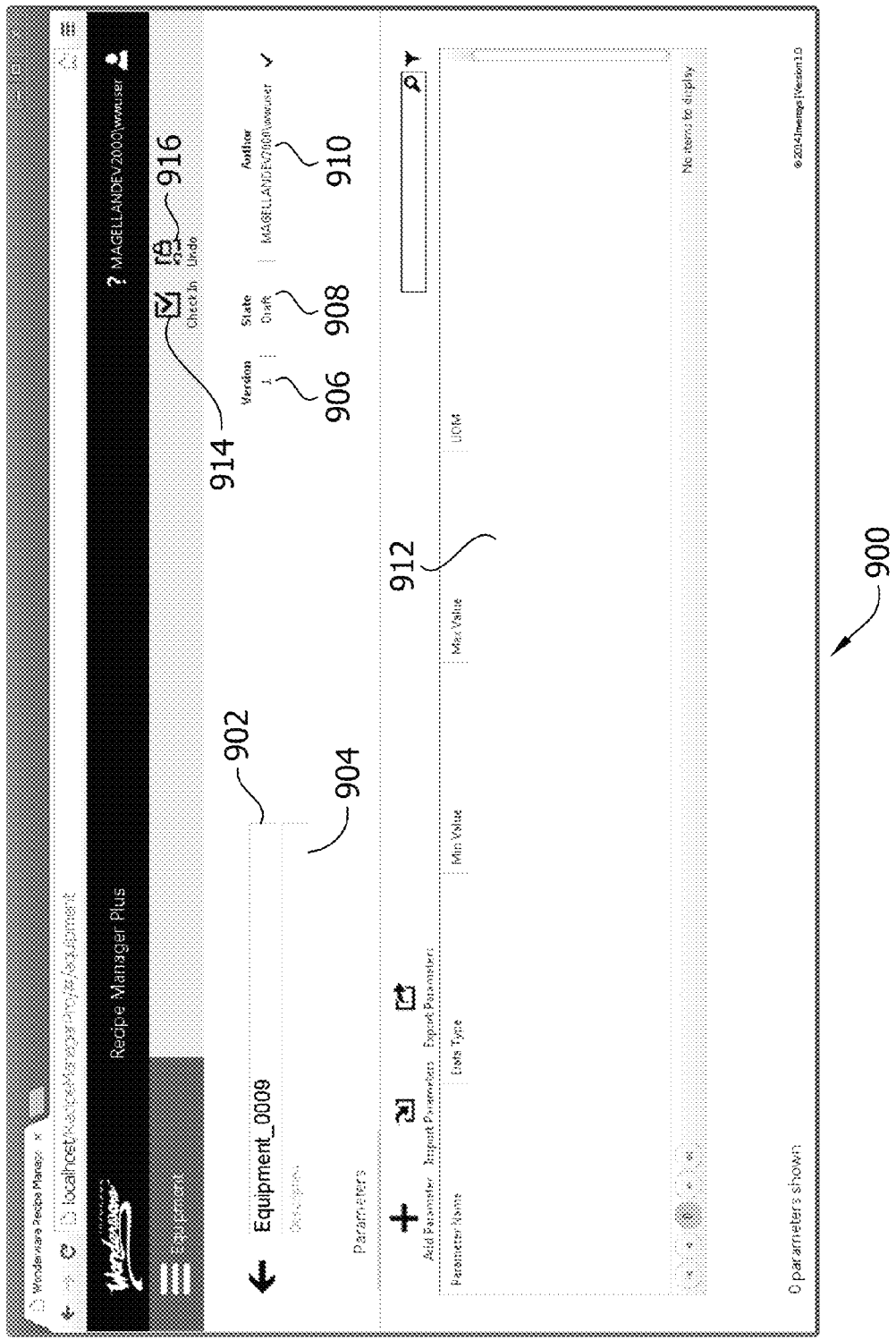
FIG. 9 is a screenshot of an add an equipment view.

As shown best in FIGS. 7-19, the recipe management system 10 provides user interface tools (e.g., via a web application) that may be accessed by a user from a recipe management configuration client 20 to configure models of the various entities (e.g., recipes, equipment, or aspects thereof, e.g., formulas, formula parameters, etc.) used to execute recipes in the process plant 18. As shown in FIG. 7, a main menu (left) 300 is accessible from any view of the illustrated recipe management system. The illustrated menu 300 includes selection objects for equipment, formula templates, formulas (i.e., formula instances), execution, parameter extensions, units of measure, etc. A user may select the equipment selection object to navigate to an equipment tiles view 700 as shown in FIGS. 7 and 8. The equipment tiles view 700 includes a main menu button 702, an add equipment button 704, and a tile 706 for each of the equipment models 52 that are already configured and stored in the configuration database 50. Each tile 706 includes basic information about the equipment model 52 it represents. For example, the illustrated tiles 706 include information about the name, configuration state (e.g., approved), and number of parameters of equipment models 52. From the equipment tiles view 700, a user may select the add equipment button 704 to navigate to a new equipment configuration view 900 (FIG. 9). Likewise, the user may select any of the equipment tiles 706 to navigate to an equipment details view 1000 (FIG. 10).

Referring to FIG. 9, when the user enters a new equipment configuration view 900, a new equipment model 52 is created and placed in a checked out state (indicated by the check-in object 914). From the new equipment configuration view 900, a user can provide a name and description for an equipment model 52 to the name field 902 and the description field 904, respectively. Corresponding fields 88, 90 of the equipment record 60 of the equipment model 52 are populated with the information provided at the name and description fields 902, 904. In addition, the user can provide information about each of the equipment parameters in an equipment model 52 (e.g., the information stored in equipment parameter records 62) to a parameters grid 912. The parameters grid 912 can be used to assign the parameter name, data type, minimum value, maximum value, and unit of measure for a parameter in the equipment model 52. The fields on the parameter grid 912 correspond with the respective fields 110, 116, 122, 120, 118 of an equipment parameter record 62 stored on the configuration database 50. As the equipment model 52 is being created, each equipment parameter record 62 will have its own row in the parameter grid 912. The display items 906, 908 and 910 indicate the version, state, and author (corresponding with the version, state and author fields 82, 96, 92 of the respective equipment record 60) for the equipment model 52. Using a check in button 914, a user can commit the new equipment model 52 to the configuration database 50. An undo button 916 can be used to track backwards through user inputs that affect the configuration of the new equipment model 52.

Figure 10:
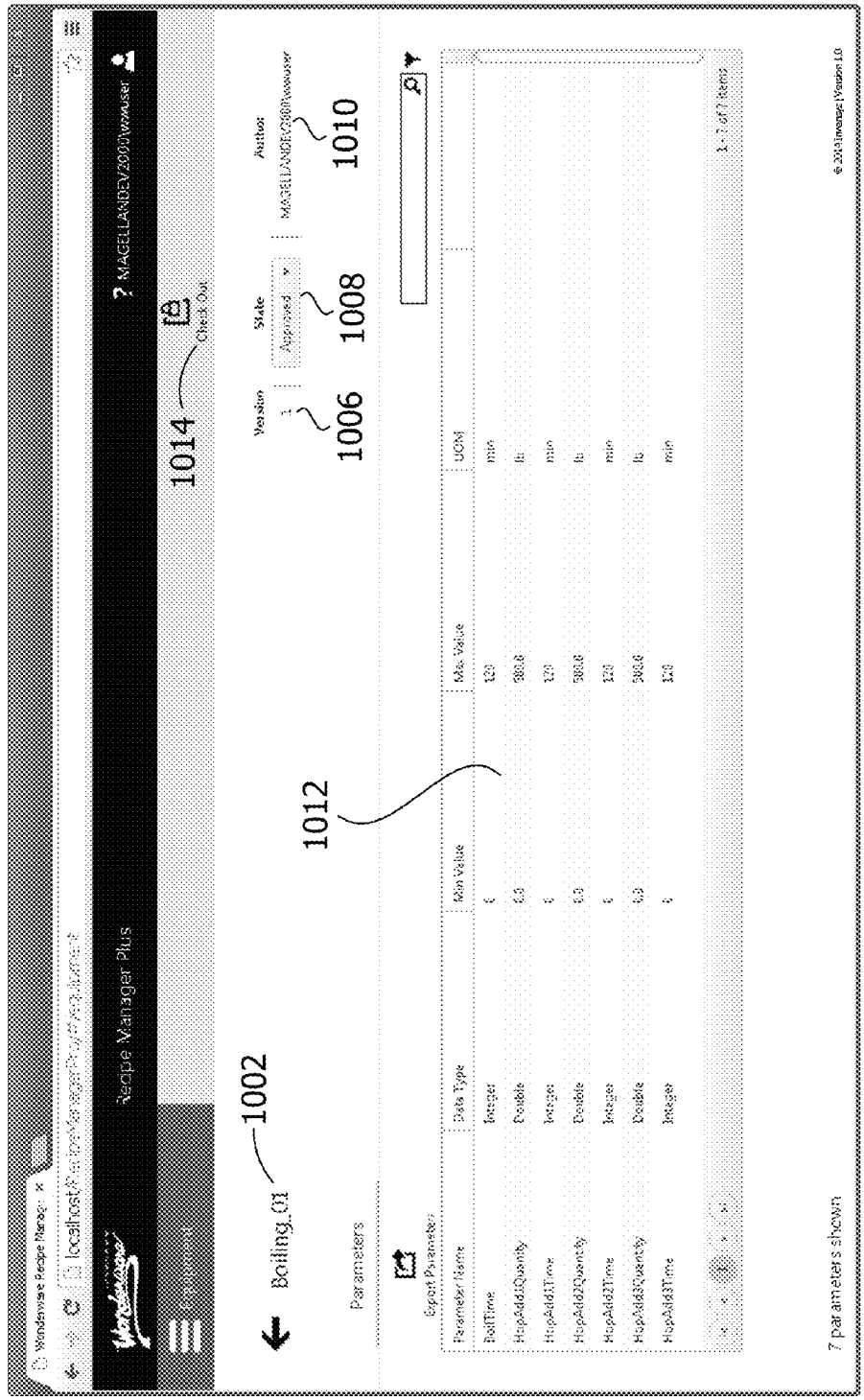
FIG. 10 is a screenshot of an equipment details view.
Figure 11:
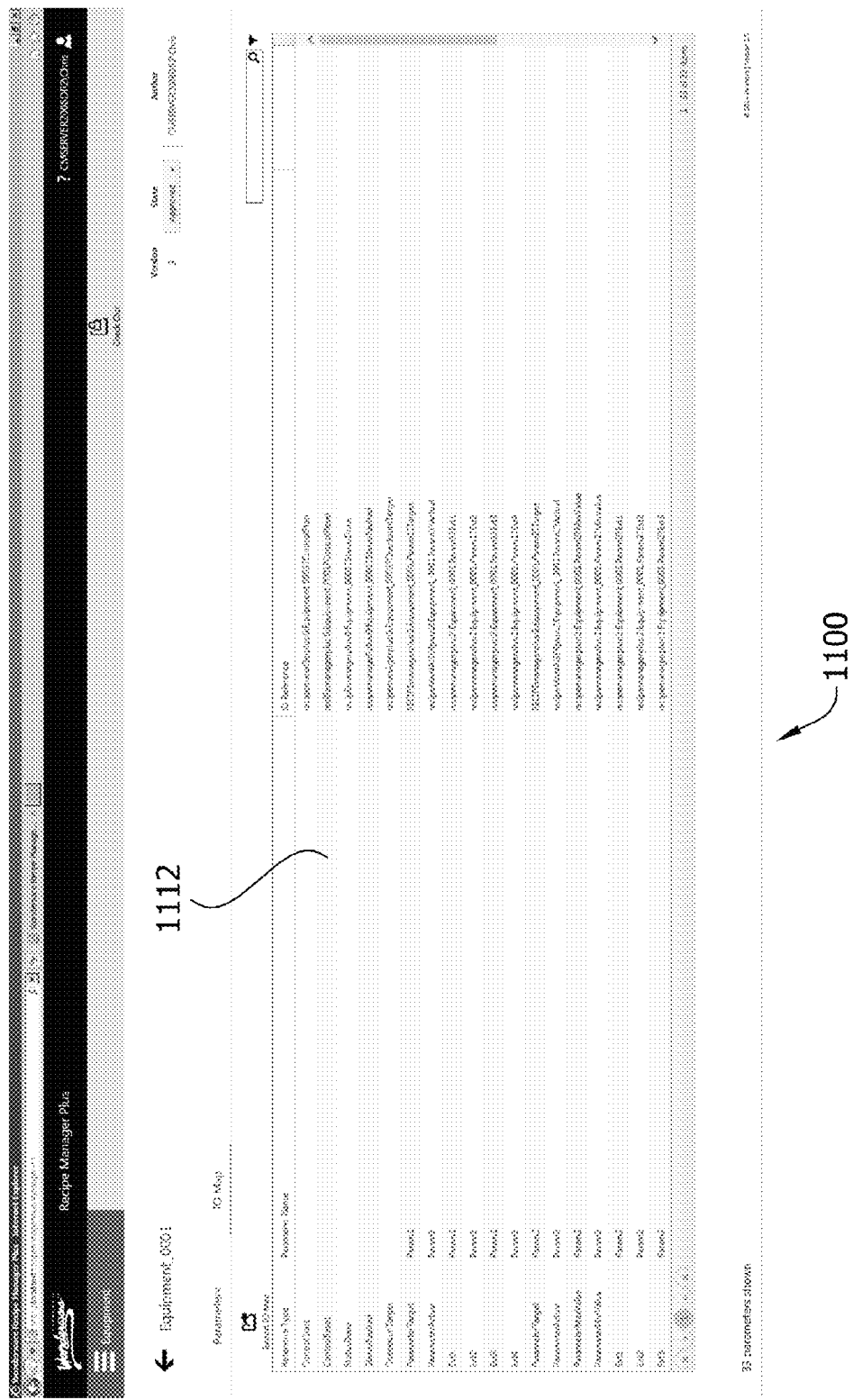
FIG. 11 is a screenshot of an IO map view for the standalone embodiment of the recipe management system.

As shown in FIG. 10, the equipment details view 1000 displays information about a previously configured equipment model 52. As discussed above, each equipment model 52 includes both an equipment record 60 and one or more equipment parameter records 62. At the user interface level, the segregation among records between aspects of an equipment model 52 is relatively transparent. Thus, the equipment details view 1000 includes information about both the equipment record 60 and its associated equipment parameter record(s) 62. In the illustrated example, the name of the equipment model appears at the name item 1002, and no description is provided. A parameters grid 1012 shows that seven parameters are included in the equipment model 52. The parameter name, data type, minimum value, maximum value, and unit of measure for each of the seven parameters can all be viewed from the parameters grid 1012. Corresponding fields in the parameters grid 1012 display data contained in corresponding fields 110, 116, 122, 120, 118 of equipment parameter records 62. The display items 1006, 1008 and 1010 indicate the version, state, and author for the equipment model 52. In the illustrated screen shot, the equipment details view 1000 shows a checked in and approved equipment model. Thus, the equipment model can be used in a control recipe and cannot currently be edited.

Using the check out object 1014, the user can check the equipment model 52 out for editing. When the equipment model 52 is checked out for editing, a copy of it is made, in which a flag is set in the checked out field 94 of the equipment record 60. In the new copy of the equipment model 52, the equipment record 60 is given a new primary key identifier at field 78, a new version identifier at field 82, and a new parent identifier at field 84. New copies of the equipment parameter records 62 in the equipment model 52 are given new primary key identifiers at field 108 and new equipment identifiers with foreign keys associating the equipment parameter records with the new copy of the equipment record 60 at field 109. The version identifier in the upper right corner of the equipment details view (the version identifier 1006 in the equipment details view 1000) will increment to reflect the newest version of the equipment model 52. An equipment details view for a checked out equipment model 52 (not shown) permits the user to change the equipment name, description, and parameter information. When a user checks in changes to an equipment model 52 (e.g., changes to the equipment record 60 such as record name/description or changes to the parameter grid including addition, deletion, or editing of parameters), the recipe management system will commit a new version of the equipment model 52 to the configuration database 50. For example, if a user checks out an equipment model 52 and adds a new parameter, at check in, the system will automatically commit a new version of an equipment record 60 and a new version of each of the equipment parameter records 62. To enable the newly checked in equipment model to be used in a control recipe, its state must be changed from draft to approved using the state drop down menu 1008.

As discussed above, when the recipe management system is used in a standalone mode, the equipment model 52 includes IO reference tags 98, 100, 102, 104, 106, 124, 126, 128, 130 that allow the execution engine 24 to read and write to the IO layer of a piece of equipment 16 in the process plant 18. An IO map view 1100 may be accessed to configure IO references for the parameters supported by an equipment model 52. As discussed above, each equipment parameter record 62 includes IO reference fields 124, 126, 128, 130 for target, actual, maximum, and minimum values. From the IO map view of FIG. 11, a user may configure these reference fields for each of the parameters in an equipment model. A user may also use this view to configure the control/status and Checksum IO references 98, 100, 102, 104, 106 of an equipment model 52 (e.g., as saved in the equipment record 60). A grid 1112 is displayed, which lists each of the IO references 62 by name, along with their reference types. By selecting an IO reference, the user is presented with data entry fields for assigning IO addresses to each IO tag in the equipment model 52. Once IO addresses have been assigned to all of the IO references, a user may check in the changes to update the equipment model 52.

Figure 12:
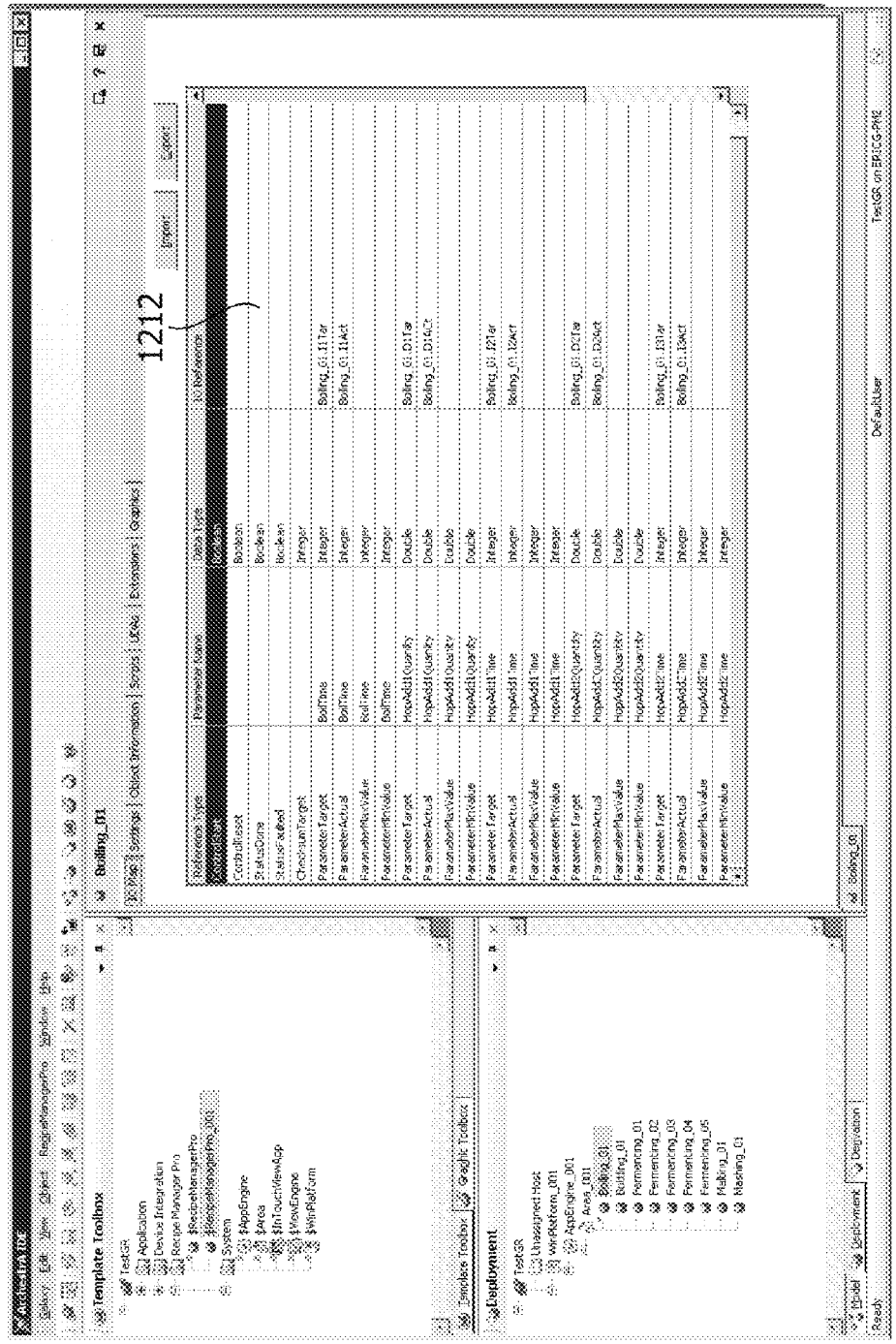
FIG. 12 is a screenshot of an IO map view for the system platform-hosted embodiment of the recipe management system.

FIG. 12 depicts the corresponding IO reference mapping view 1200 for embodiments of the recipe management system 10 that run the execution engine 26 in a system platform 28. As discussed above, equipment models 52 (including the data contained in an equipment record 60 and its equipment parameter records 62) are imported to the system platform 28 for IO mapping. The system platform 28 of the illustrated embodiment is preferably Archestra IDE, which is developed and sold by the assignee of the present application. However, other system platforms can also be used without departing from the scope of the invention. In FIG. 12, the IO references of the imported equipment model (Boiling_01) are shown in a configuration grid 1212. The user may fill out the fields of the configuration grid 1212 to provide IO addresses for the equipment model 52.

Figure 13:
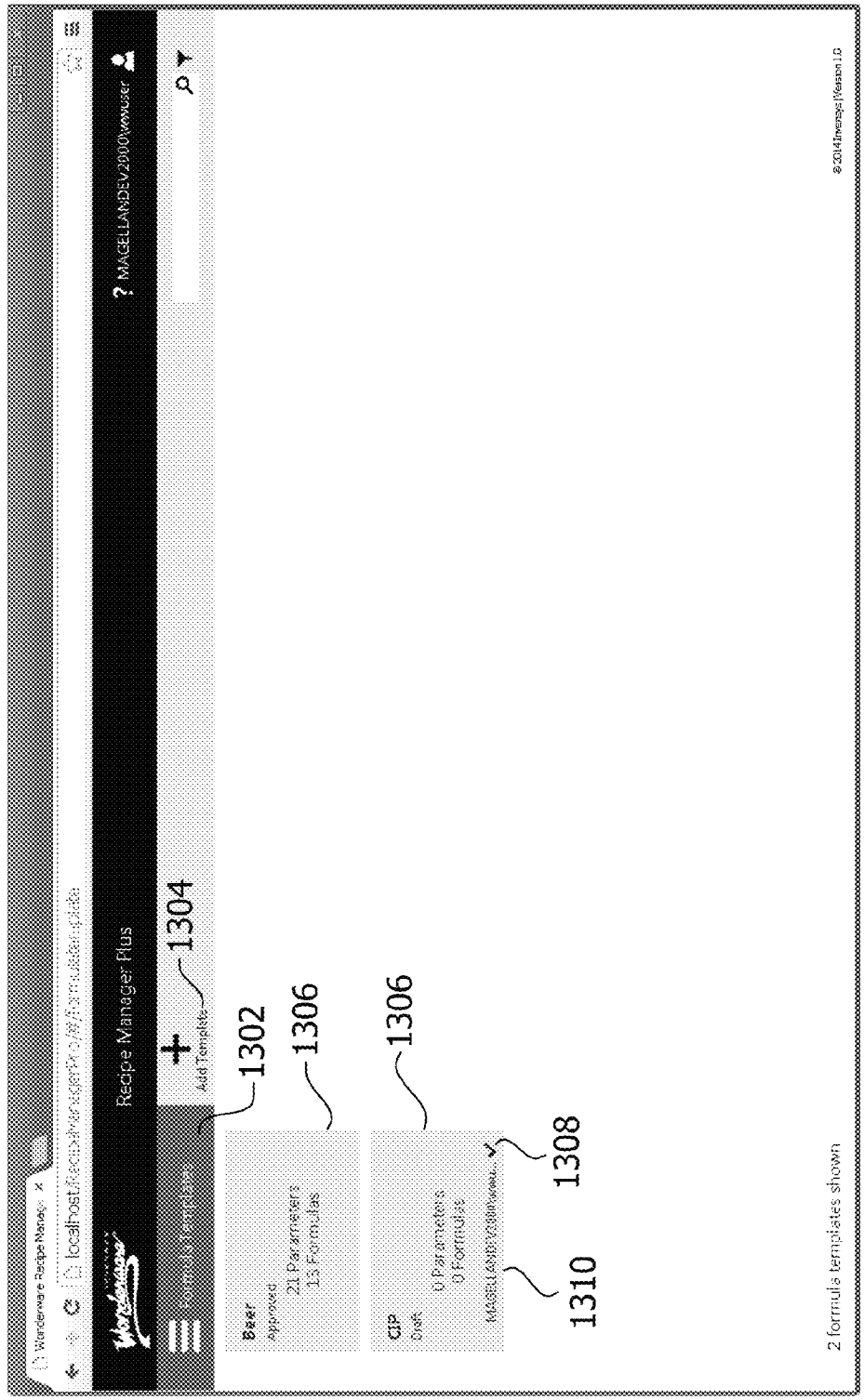
FIG. 13 is a screenshot of a formula template tiles view.
Figure 14:
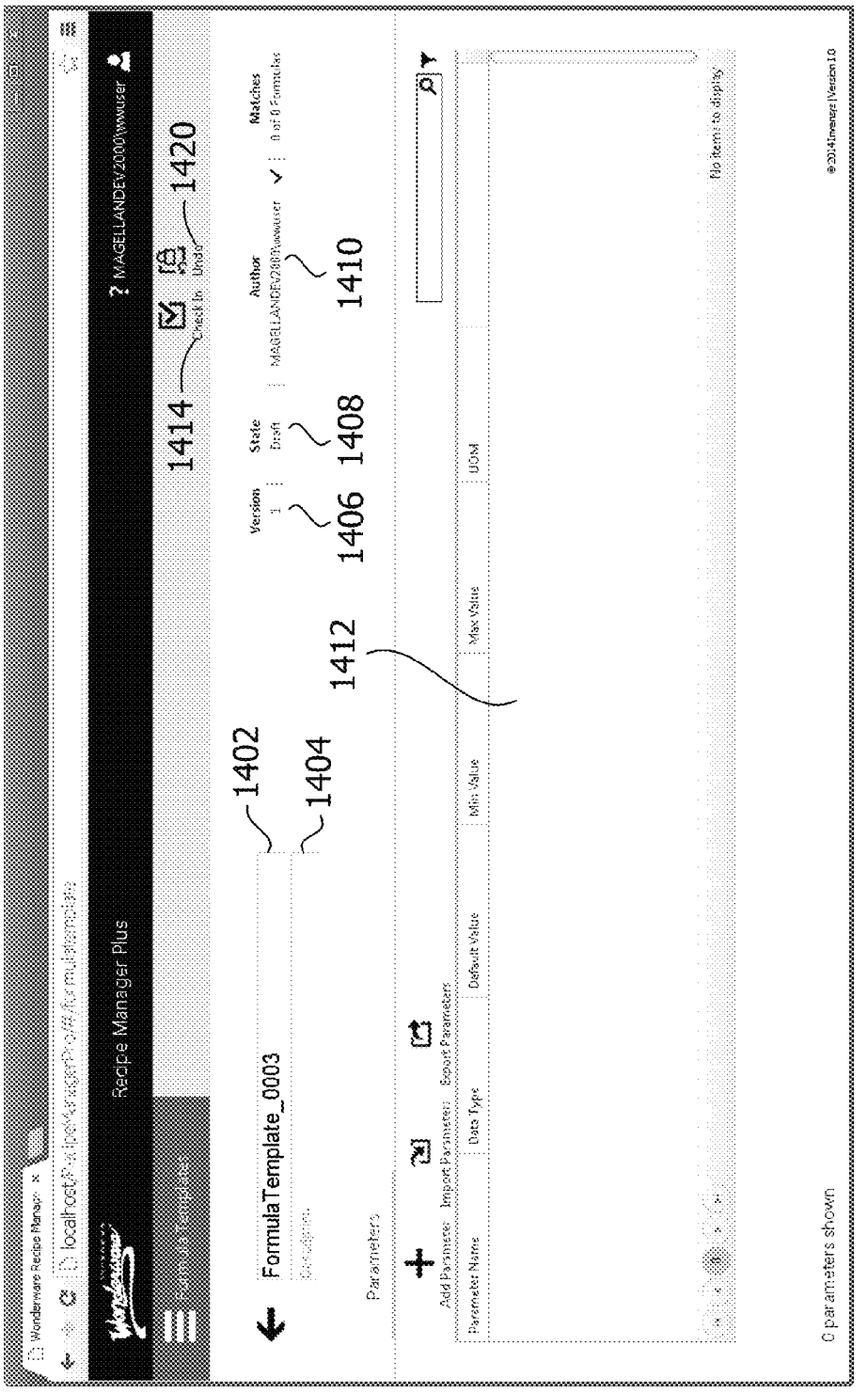
FIG. 14 is a screenshot of an add a formula template view.

From the main menu 300 of the recipe management system configuration client 24 (FIG. 7), a user may select the formula templates selection icon to navigate to a formula template tiles view 1300, such as is depicted in FIG. 13. The formula template tiles view 1300 includes a main menu button 1302, an add formula template button 1304, and a tile 1306 for each of the formula template models 67 that is already configured and stored in the configuration database (e.g., one tile 1306 for each formula template record 66 that is stored in the configuration database). Each tile 1306 includes basic information about the formula template model 67 it represents. For example, each formula template tile 1306 displays the configuration state of a formula template model 67, the number of parameters assigned to the formula template model (based on the number of formula parameter records 68 associated with a respective formula template record 66), the number of formula instances created from the formula template (based on the number of formula instance records 70 associated with a respective formula template record 66), a checked out icon 1308 if the formula template is currently checked out (based on the checked out field 146 of a respective formula template record 66), and a user identifier 1310 indicating to whom the formula template model is checked out (if applicable). From the formula template tiles view 1300, a user may select an add formula template button 1304 to navigate to a new formula template configuration view 1400 (FIG. 14). Likewise, the user may select any of the formula template tiles 1306 to navigate to a formula template model details view 1500 (FIG. 15).

Referring to FIG. 14, when the user enters a new formula template configuration view 1400, a new formula template model 67 is created and placed in a checked out state (indicated by the check-in object 1414). From the new formula template configuration view 1400, a user can provide a name and description for a formula template model 67 to the name field 1402 and the description field 1404, respectively. Corresponding fields 142, 144 of the formula template record 66 of the formula template model 67 are populated with the information provided at the name and description fields 1402, 1404. In addition, the user can provide information about each of the formula parameters (e.g., the information stored in formula parameter records 68 and default formula parameter detail records 72) in a formula template model 67 to a parameters grid 1412. Each formula template parameter has its own row in the parameter grid 1412. The parameters grid 1412 can be used to assign the parameter name, data type, default value, minimum value, maximum value, and unit of measure for a parameter in the formula template model 67. For each row, the fields on the parameter grid 1412 correspond with the respective field 170 of a formula parameter record 68 and fields 181, 184, 188, 186, 182 of a default formula parameter detail record 72 stored on the configuration database 50. The display items 1406, 1408 and 1410 indicate the version, state, and author for the formula template model 67. Using a check in button 1414, a user can commit the new formula template model 67 to the configuration database 50. An undo button 1420 can be used to track backwards through user inputs that affect the configuration of the new formula template model 67.

Figure 15:
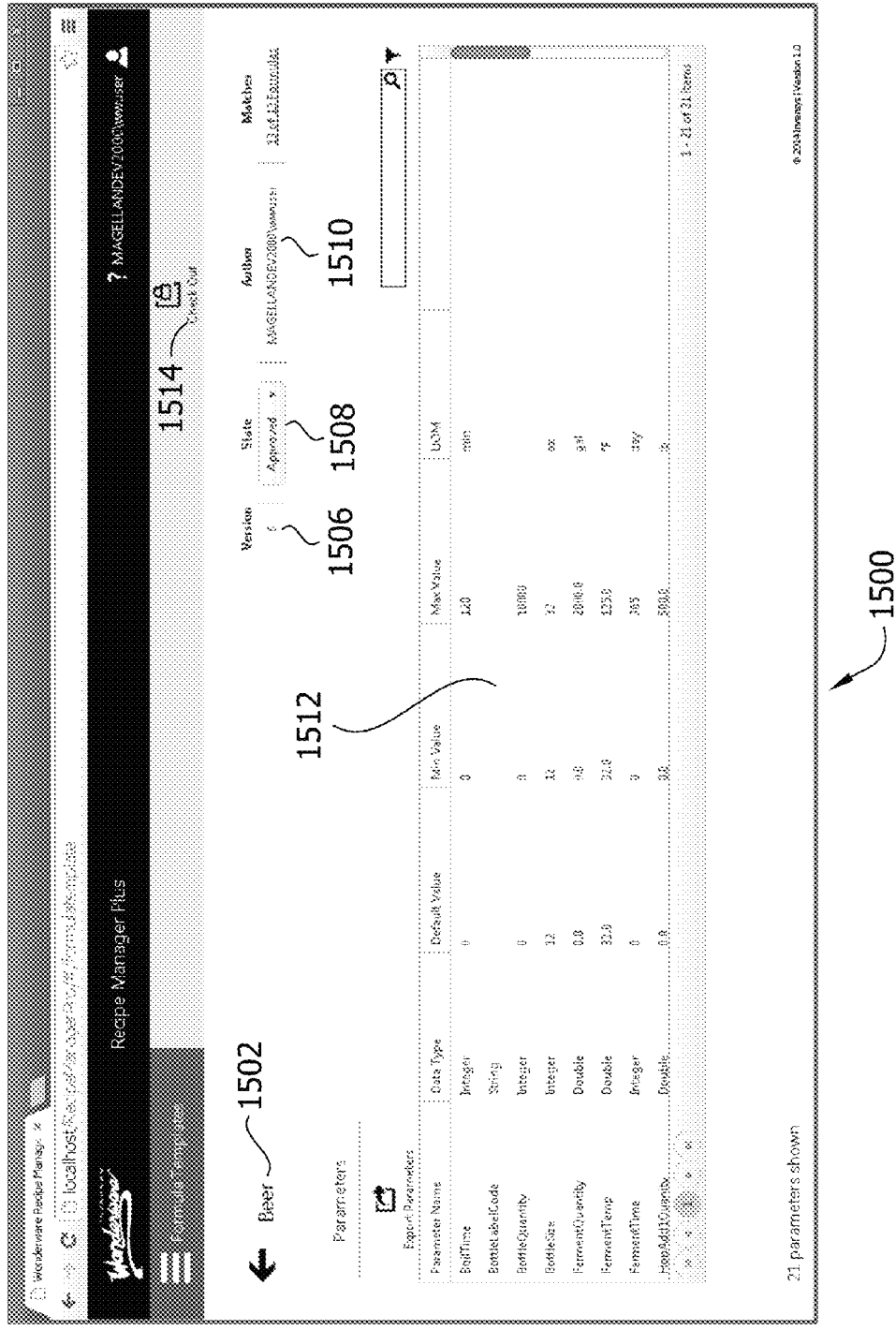
FIG. 15 is a screenshot of a formula template details view.

As shown in FIG. 15, the formula template details view 1500 displays information about a previously configured formula template model 67. As discussed above, each formula template model 67 includes a formula template record 66 and one or more formula parameter record(s) 68 and default formula parameter detail record(s) 72. At the user interface level, the segregation among records between aspects of a formula template model 67 is relatively transparent. Thus, the formula template model details view 1500 includes information about a formula template record 66 and one or more formula parameter record(s) 68 and default formula parameter detail record(s) 72. In the illustrated example, the name of the formula template model 67 appears at the name item 1502, and no description is provided. A parameters grid 1512 shows that 21 parameters are included in the formula template model 67. The parameter name, data type, default value, minimum value, maximum value, and unit of measure for each of the seven parameters can all be viewed from the parameters grid 1512. Corresponding fields in the parameters grid 1512 display data contained in a corresponding field 170 of a formula parameter record 68 and fields 181, 184 (i.e., the default value on the parameters grid 1512 corresponds with the target value field 184), 188, 186, 182 of a default formula parameter detail record 72. When the formula parameter detail record 72 is used as a default formula parameter detail record, the target value field 184 stores the default value for a formula template parameter, which is displayed in the parameters grid 1512 under the default value column. The display items 1506, 1508 and 1510 indicate the version, state, and author for the formula template model 67. In the illustrated screen shot, the formula template details view 1500 shows a checked in and approved formula template model 67. Thus, the formula template model 67 cannot currently be edited.

Using the check out object 1514, the user can check the formula template model 67 out for editing. When the formula template model 67 is checked out for editing, a copy of it is made, in which a flag is set in the checked out field 146 of the formula template record 66. In the new copy of the formula template model 67, the formula template record 66 is given a new primary key identifier at field 132, a new version identifier at field 136, and a new parent identifier at field 138. New copies of the formula parameter records 68 in the formula template model 67 are given new primary key identifiers at field 166 and new formula template identifiers with foreign keys associating the formula parameter records with the new copy of the formula template record 66 at field 168. Likewise, new copies of the default formula parameter detail records 72 in the formula template model 67 are given new primary key identifiers at field 176 and new formula parameter identifiers with foreign keys associating the formula parameter detail records with new copies of the respective formula parameter records 68 at field 178. The version identifier in the upper right corner of the formula template details view (the version identifier 1506 in the equipment details view 1500) will increment to reflect the newest version of the formula template model 67. A formula template details view for a checked out formula template model 67 (not shown) permits the user to change the formula template name, description, and parameter information. When a user checks in changes to a formula template model 67 (e.g., changes to the formula template entity record 66 such as record name/description or changes to the parameter grid including addition, deletion, or editing of parameters), the recipe management system will commit a new version of the formula template model 67 to the configuration database 50. For example, if a user checks out a formula template model 67 and edits a parameter, at check in, the system will automatically commit a new version of a formula template record 66 and a new version of each of the formula parameter records 68 and default formula parameter detail records 72 to the configuration database.

Figure 16:
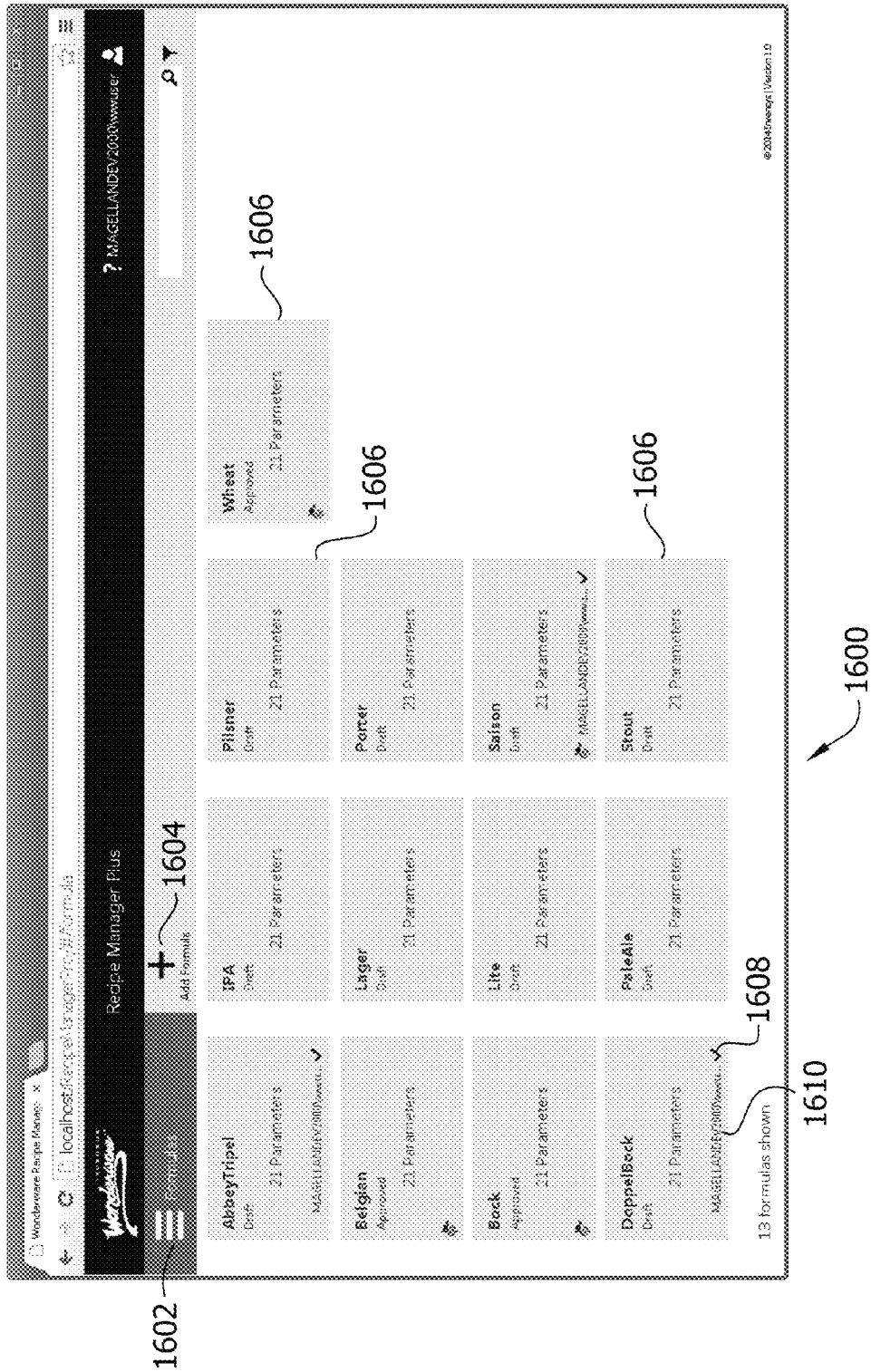
FIG. 16 is a screenshot of a formula instance tiles view.
Figure 17:
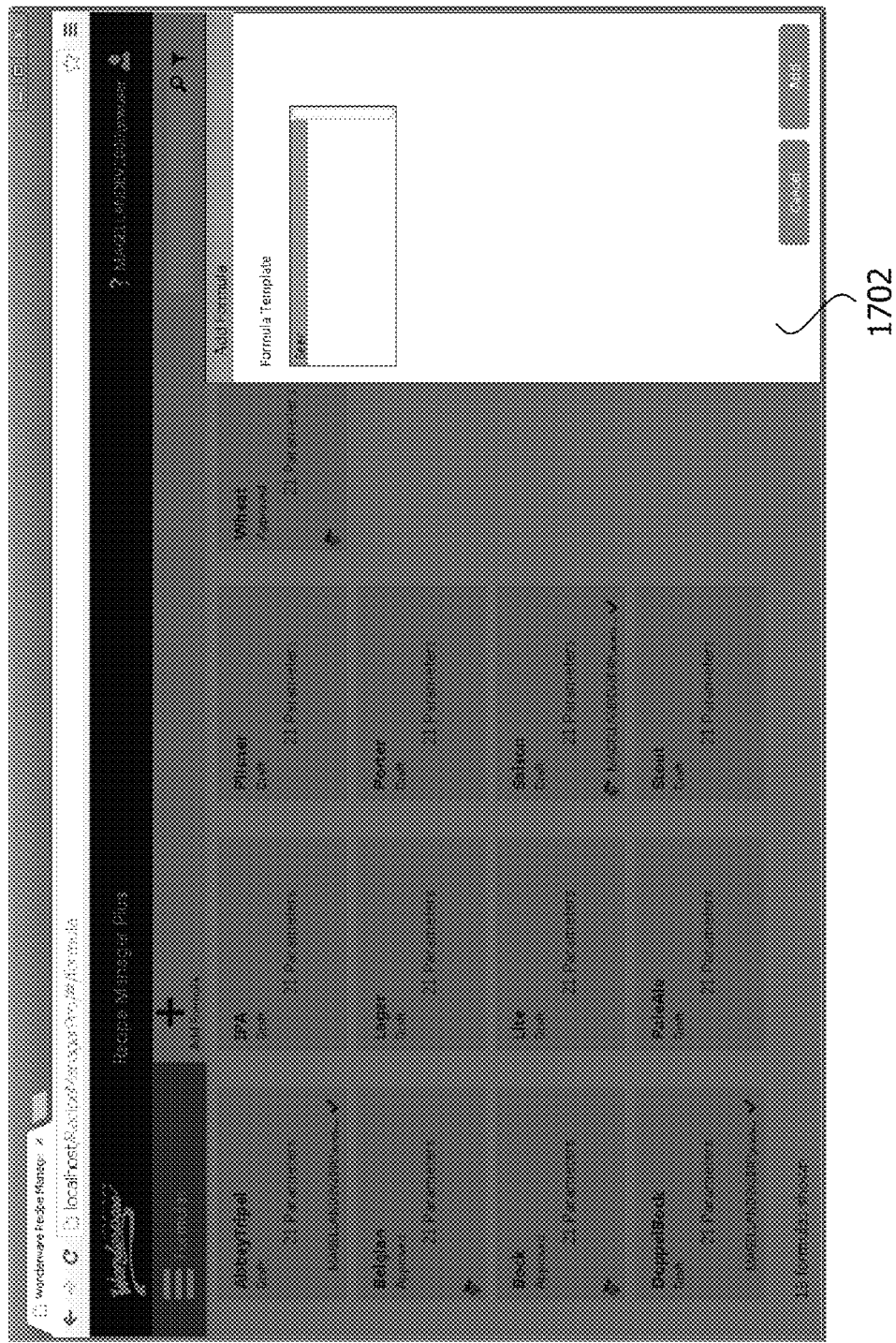
FIG. 17 is a screenshot of the formula instance tiles view with a slide out formula template selection menu opened.
Figure 18:
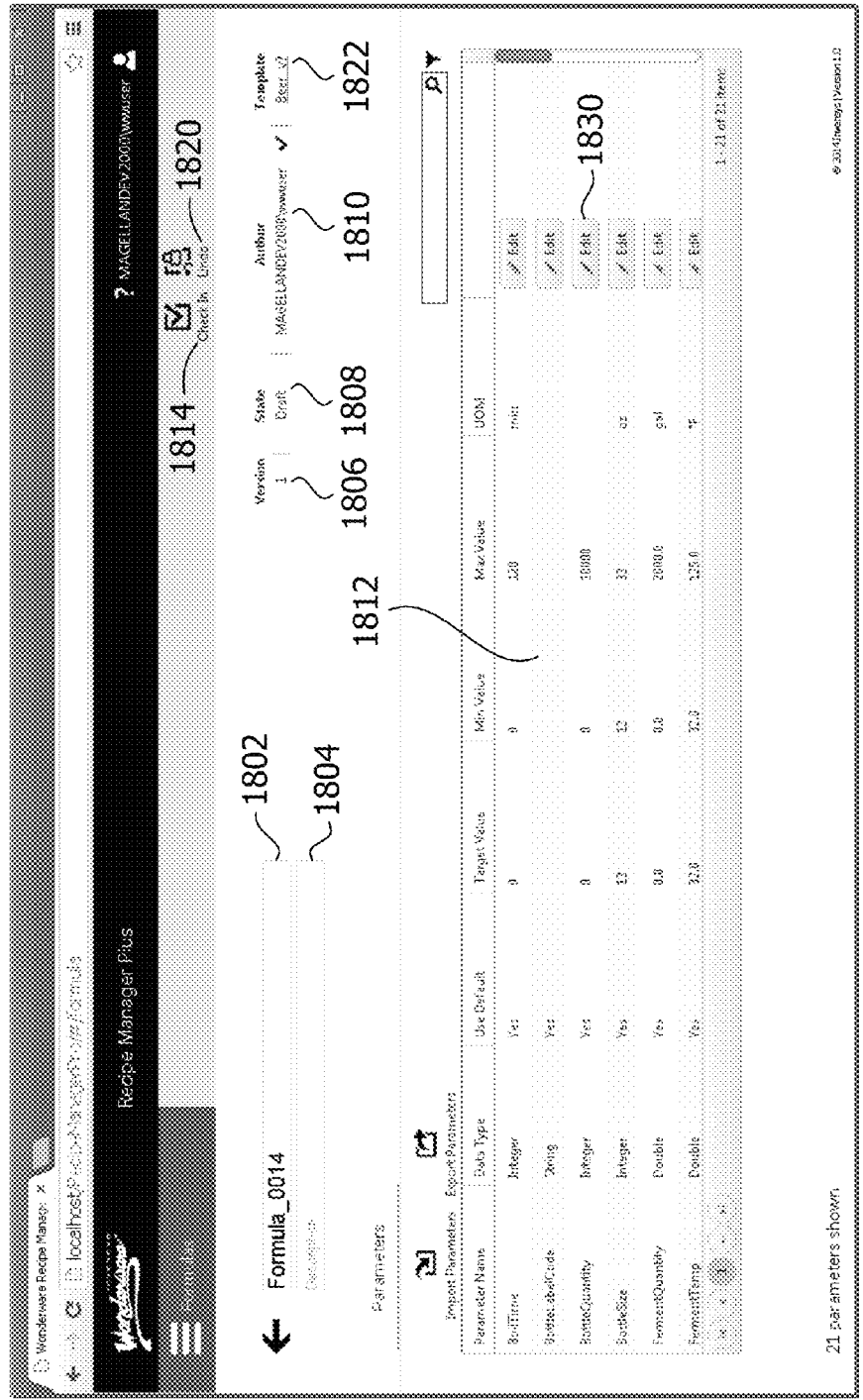
FIG. 18 is a screenshot of an add a formula instance view.

Once a formula template model 67 has been configured and checked in, a user can add formula instance models 71. From the main menu 300 (FIG. 7), a user may select the formula instances selection icon (labeled "Formulas") to navigate to a formula instance tiles view 1600, such as is depicted in FIG. 16. The formula instances tiles view 1600 includes a main menu button 1602, an add formula instance button 1604, and a tile 1606 for each of the formula instance models 71 that is already configured and stored in the configuration database. Each tile 1606 includes basic information about the formula model 71 it represents. For example, each formula instance tile 1606 displays the state of a formula instance model (e.g., "approved," "draft," etc.), the number of parameters assigned to the formula instance model 71 (based on the number of formula parameter records 68 that are associated with the formula template record 66 with which the formula instance record 70 is also associated), a checked out icon 1608 if the formula instance is currently checked out, and a user identifier 1610 indicating to whom the formula instance model is checked out (if applicable). From the formula instance tiles view 1600, a user may select the add formula instance button 1604 to navigate to a new formula instance configuration view 1800 (FIG. 18). First, when the user selects the add formula instance button 1604, a slide out menu 1702 will appear as shown in FIG. 17. The slide out menu 1702 contains a list of the current versions of all the formula templates 67 in the configuration database, whether or not approved. The user selects the desired formula template model 67 from the slide out menu 1702 to navigate to a new formula instance configuration view 1800 that is prepopulated with the information contained in the parent formula template model 67 (FIG. 18). For example, the illustrated recipe management system 10 automatically populates the name and description fields 1802, 1804, as well as the parameter grid 1812, based on the information contained in the parent formula template model 67. From the formula instance tiles view 1600 (FIG. 16), a user may also select any of the formula instance tiles 1606 to navigate to a formula instance model details view 1900 (FIG. 19).

Referring to FIG. 18, when the user enters a new formula instance configuration view 1800, a new formula instance model 71 is created (using the information in the parent formula template model 67) and placed in a checked out state (indicated by the check-in object 1814). From the new formula instance configuration view 1800, a user can edit the name and description for a formula instance model 71 with the name field 1802 and the description field 1804, respectively. Corresponding fields 151, 153 of the formula instance record 70 of the formula instance model 71 are populated with the information provided at the name and description fields 1802, 1804. In addition, the user can provide information about each of the formula instance parameters in a formula instance model 71 (i.e., information stored in respective formula parameter records 68, default formula parameter detail records 72, and override formula parameter detail records) to a parameters grid 1812. Initially, the new formula instance configuration view 1800 is populated with default formula parameter information from the parent formula template model 67. The user can edit this information to override the formula parameter defaults for the formula instance model 71. In the illustrated embodiment, the parameters grid 1812 can be used to edit the target value, minimum value, and maximum value for a parameter in the formula instance model 71. However, it is contemplated that, in other embodiments, other aspects of a parent formula template model could be changed in a child formula instance model. For each formula parameter whose default values are changed (e.g., target value, minimum value, or maximum value), an override formula parameter detail record 72 is created. The override formula parameter detail record 72 will be created with a new primary key identifier 176, new formula instance identifier 180, which associates the record with the formula instance record 70 for the model 71, and a new formula parameter identifier 178, which associates the record with the respective formula parameter record 68. The display items 1806, 1808 and 1810 indicate the version, state, and author for the formula instance model 71. The display item 1822 indicates the name of the parent formula template model 67 from which the formula instance model 71 is created. Using a check in button 1814, a user can commit the new formula instance model 71 to the configuration database 50. An undo button 1820 can be used to track backwards through user inputs that affect the configuration of the new formula instance model 71.

Figure 19:
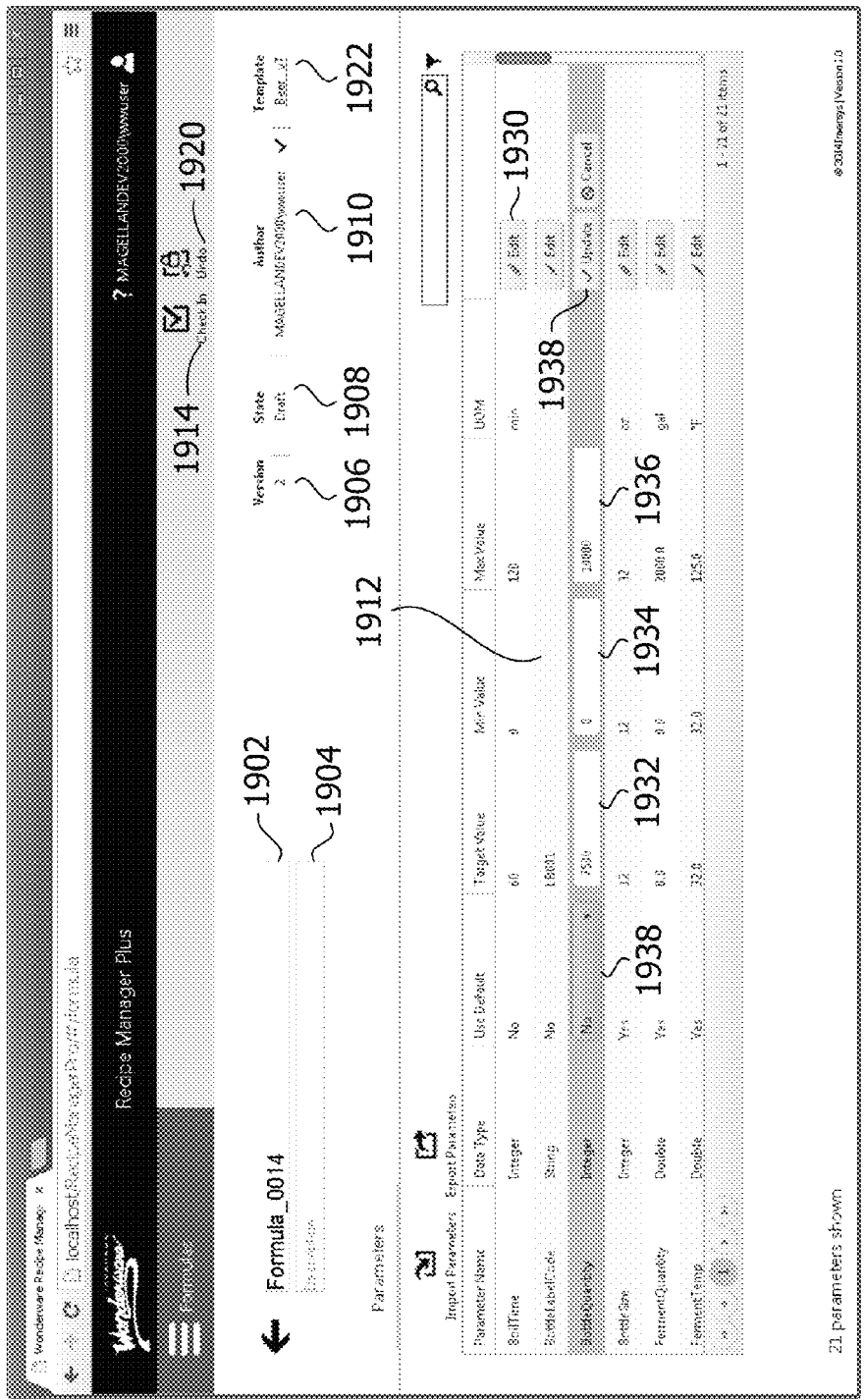
FIG. 19 is a screenshot of the add a formula instance view with one of the parameters ready for update.

As shown in FIG. 19, a formula instance details view 1900 for a checked out formula instance model 67 displays information about a previously configured formula instance model 71 and permits editing. As discussed above, each formula instance model 67 includes a formula instance record 70, one or more formula parameter record(s) 68, and one or more default formula parameter detail record(s) 72 and/or override formula parameter detail record(s). At the user interface level, the segregation among records between aspects of a formula instance model 71 is relatively transparent. Thus, the formula instance model details view 1900 includes information about one formula instance record 70 and one or more formula parameter record(s) 68 and formula parameter detail record(s) 72. In the illustrated example, the name of the formula instance model 71 appears at the name item 1902, and no description is provided (though one can be provided at the description field 1904). A parameters grid 1912 shows that 21 parameters are included in the formula instance model 71. The parameter name, data type, default value, minimum value, maximum value, and unit of measure for each of the 21 parameters can all be viewed from the parameters grid 1912. For default parameters (i.e., parameters in the parameters grid for which the default field is set to yes), the data displayed in the parameters grid 1912 corresponds with data contained in a field 170 of a formula parameter record 68 and fields 181, 184, 188, 186, 182 of a default formula parameter detail record 72. For non-default parameters (i.e., parameters in the parameters grid for which the default field is set to no), the data displayed in the parameters grid 1912 corresponds with data contained in a field 170 of a formula parameter record 68 and fields 181, 184, 188, 186, 182 of an override formula parameter detail record 72. The display items 1906, 1908 and 1910 indicate the version, state, and author for the formula instance model 71. In the illustrated screen shot, the formula template details view 1900 shows a checked out and draft formula instance model 71. Thus, the formula instance model 71 can currently be edited.

As is the case for formula template models 67 and equipment models 52, when the user checks out a formula instance model 71 for editing, the recipe management system 10 creates a copy of the formula instance model. The copy of the formula instance model 71 includes a copied formula instance record 70 with a new primary key identifier at field 150, version identifier at field 154, and parent identifier at field 156. In addition, the copy of the formula instance model 71 includes a copy of each override formula parameter detail entity 72 with new primary key identifier at field 176 and new formula instance identifier at field 180, which associates the formula parameter detail record with the new copy of the formula instance record 70. The new version of the copied formula instance model 71 will be reflected at the version item 1906 of formula instance details view 1900 for a checked out model. To edit a parameter in the parameter grid 1912, the user selects an edit parameter button 1930. In the illustrated screen shot, a BottleQuantity parameter is selected for editing. A dropdown menu 1938 permits the user to choose whether to use default values for the parameter. A target value field 1932 permits the user to enter a new target value, a minimum value field 1934 permits the user to enter a new minimum value, and a maximum value 1936 field permits the user to enter a new maximum value. When the user selects the update button 1938, a new override formula parameter detail record 72 will be stored on the configuration database 50. The new formula parameter detail record 72 will have a new primary key identifier 176, new formula instance identifier 180, which associates it with a respective formula instance record 70, and a new formula parameter identifier 178, which associates it with a respective formula parameter record 68. When a user checks in changes to a formula instance model 71 using the check in selection item 1914 (e.g., changes to the formula instance record 70 such as record name/description or changes to the parameter grid including addition, deletion, or editing of parameters), the recipe management system will commit a new version of the formula instance model 71 to the configuration database 50. For example, if a user checks out a formula instance model 71 and overrides the default value of a formula parameter, at check in, the system will automatically commit a new version of a formula instance record 70 and at least one new override formula parameter detail record 72 to the configuration database 50. Once checked in, the user can change the state using a drop down menu (not shown) at the state field 1908.

As shown in FIG. 20, the illustrated recipe management system includes a processor-executable versioning method 2000 that protects associations between related configuration models. In the illustrated exemplary embodiment, the versioning scheme protects associations between formula template models 67 and formula instance models 71. However, it should be understood that the versioning scheme may also be used to protect associations between other related configuration models that are saved to a recipe management system configuration database. A formula template model 67 is a defining model for its child formula template models 71 (defined models). That is, a formula template 67 defines the basic form of its child formula instance models 71. Other types of defining and defined models may also exist. For example, it is contemplated that in some embodiments a recipe model 56 may be associated with a formula instance model 71 (e.g., the recipe, which is represented by a model, may include a formula instance entity and another entity, such as a procedure or operation entity, which can also be represented by models). Thus, in some embodiments, defining models may define a portion of the form or data of the defined models to which they are related. The illustrated versioning scheme may also be used to protect associations between such types of related entities. Oftentimes, it is useful to define one type of recipe management system model, at least in part, with another recipe management system model. For example, in the illustrated recipe management system, a formula template model 67 is used to define a formula instance model 71. In this case, a formula template 67 may be broadly considered a defining model, and the formula instance 71 may be broadly considered a defined model. Likewise, in recipe management systems where recipe models 56 are defined by formula instance 71 models, the formula instance model is the defining model, and the recipe is the defined model.

Generally, recipe management system models (e.g., formula template models 67, formula instance models 71, equipment models 52, and recipe models 56) represent (either generically or specifically) entities (e.g., parameters, recipes, equipment, aspects of recipes, aspects of equipment, etc.) that are in or are used to control a process plant. In some embodiments, the versioning scheme protects associations between defining models and defined models. It should be understood that, though the illustrated embodiment protects associations between formula template models 67 and formula instance models 71, other recipe management systems may protect associations between other defining models and defined models without departing from the scope of the invention. Likewise, it should be understood that, though the illustrated method includes one defining formula template model 71 and a single defined formula instance model 67, other embodiments can (and often will) have multiple defined models that respond to changes in a defining model as described with respect to the defined formula instance model and defining formula template model, below. Both the defining and defined models of the illustrated embodiment use several identifiers to facilitate the versioning system. A root identifier is constant across all respective versions of a model. A primary identifier is different for each version of each model saved in the configuration database, and a version identifier is different for each version of one model stored in the configuration database. As discussed above, when formula template models 67 are saved to the configuration database 50, their formula template records 66 are automatically populated with primary key, root, and version identifier values 132, 134, 136 (FIG. 5). Likewise, when a formula instance model 71 is saved to the configuration database 50, its formula instance record 70 is automatically populated with primary key, root, and version identifier values in the respective fields 150, 152, 154.

In the versioning method 2000, inputs creating or modifying a model are entered at the configuration client 20 of the recipe management system 10 and sent to the system server 22. A method of creating or modifying a model 2150, illustrated in FIG. 21, provides a more detailed explanation the preferred response of the recipe management system 10 to user inputs 2152 that are received to create or modify a model. In one embodiment of the versioning scheme 2000 (FIG. 20), each time user inputs creating or modifying a model are received, the recipe management system 10 performs the steps of the method of modifying a model

2100. However, other sequences of steps may be used to create or modify a model without departing from the scope of the invention.

Referring to FIG. 21, depending on whether the new model is a first version (i.e., a creation) or a subsequent version (i.e., a modification), one of two types of inputs are received at step 2152. The recipe management system can receive a request to create an initial version of a model 2152A. For example, the request to create an initial version of a model 2152A can include a user input selecting an add a formula template button 1304 (FIG. 13) or add a formula instance button 1604 (FIG. 16). The recipe management system 10 can also receive a request to modify a preexisting model 2152B. For example, the check out button 1514 can be selected from a formula template details view 1500 to check out a preexisting formula template model 67 for edit (FIG. 15), and the check out button can be selected from a formula instance details view (not shown) to check out a preexisting formula instance model 71 for edit. In either case, whether a new model is being created or a preexisting model is being modified, once the input is received at step 2152, at step 2154, the system automatically assigns a primary key, version, and root identifier to the model, as discussed in more detail below. In the illustrated embodiment, the assignment of identifiers (step 2154) occurs after receipt of a creation input (step 2152). However, it is contemplated that in other embodiments identifiers will not be assigned until receipt of a request for commitment (step 2158). After assigning the identifiers in step 2154, the recipe management system 10 receives user inputs entering or modifying data (step 2156). As shown in FIGS. 14-20 and discussed above, such user inputs may include, for example, providing a name and/or description (for formula template models 67), adding a parameter (for formula template models), providing a parameter name (for formula template models), data type (for formula template models), default value (for formula template models), target value (for formula instance models 71) minimum value (for either formula instance or template models), maximum value (for either formula instance or template models), or unit of measure (for formula template models). New parameters are automatically saved to the database as they are entered. However, it is contemplated that in some embodiments new parameters will not be saved until the model is committed (step 2158). Finally, the system receives a user input requesting the model be committed (step 2158). For example, in the illustrated recipe management system the commitment request 2158 occurs when a user selects the check in button for a model.

Figure 20A:
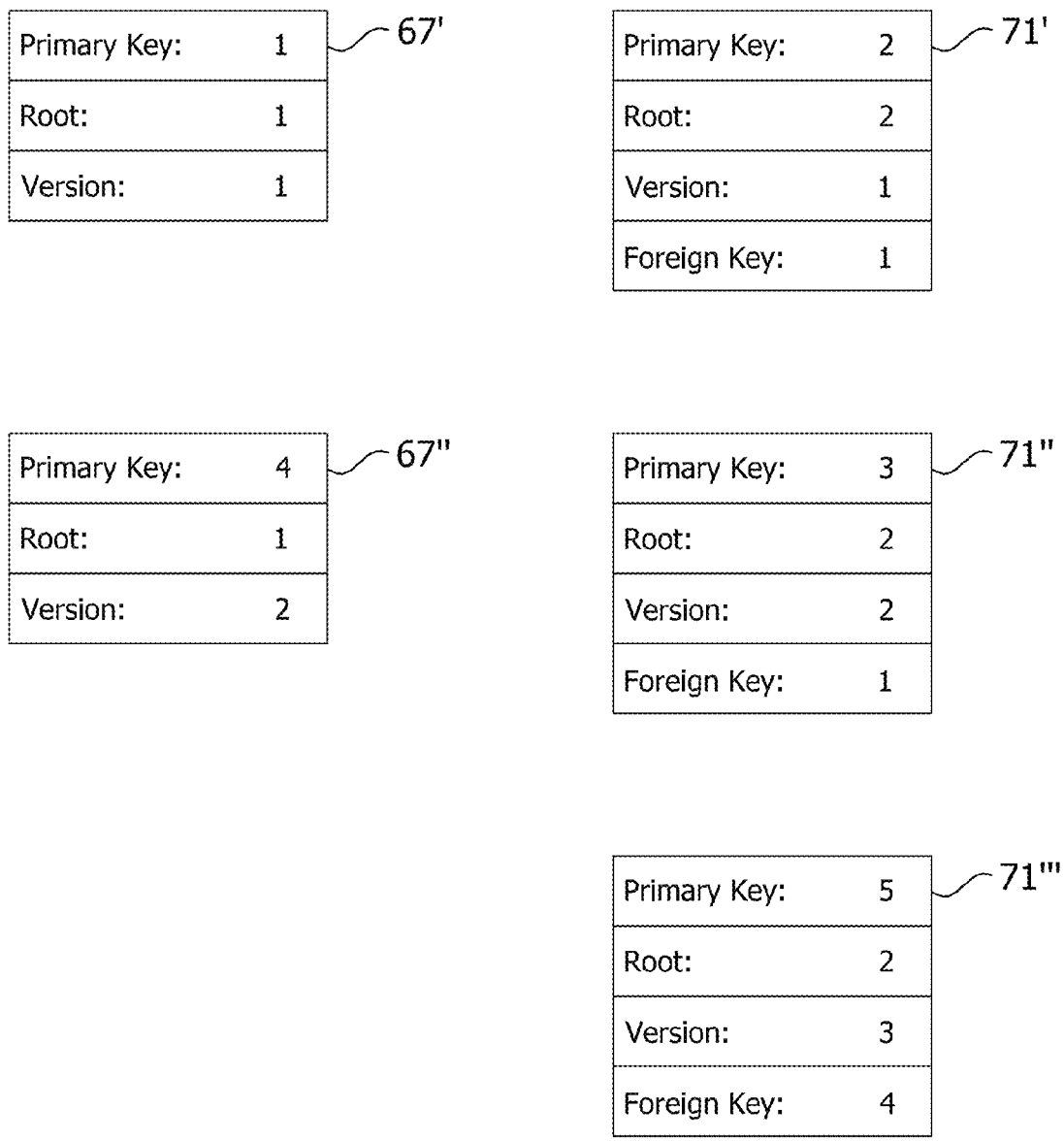
FIG. 20A is a block diagram illustrating the models created in the versioning method of FIG. 21.
Figure 21:
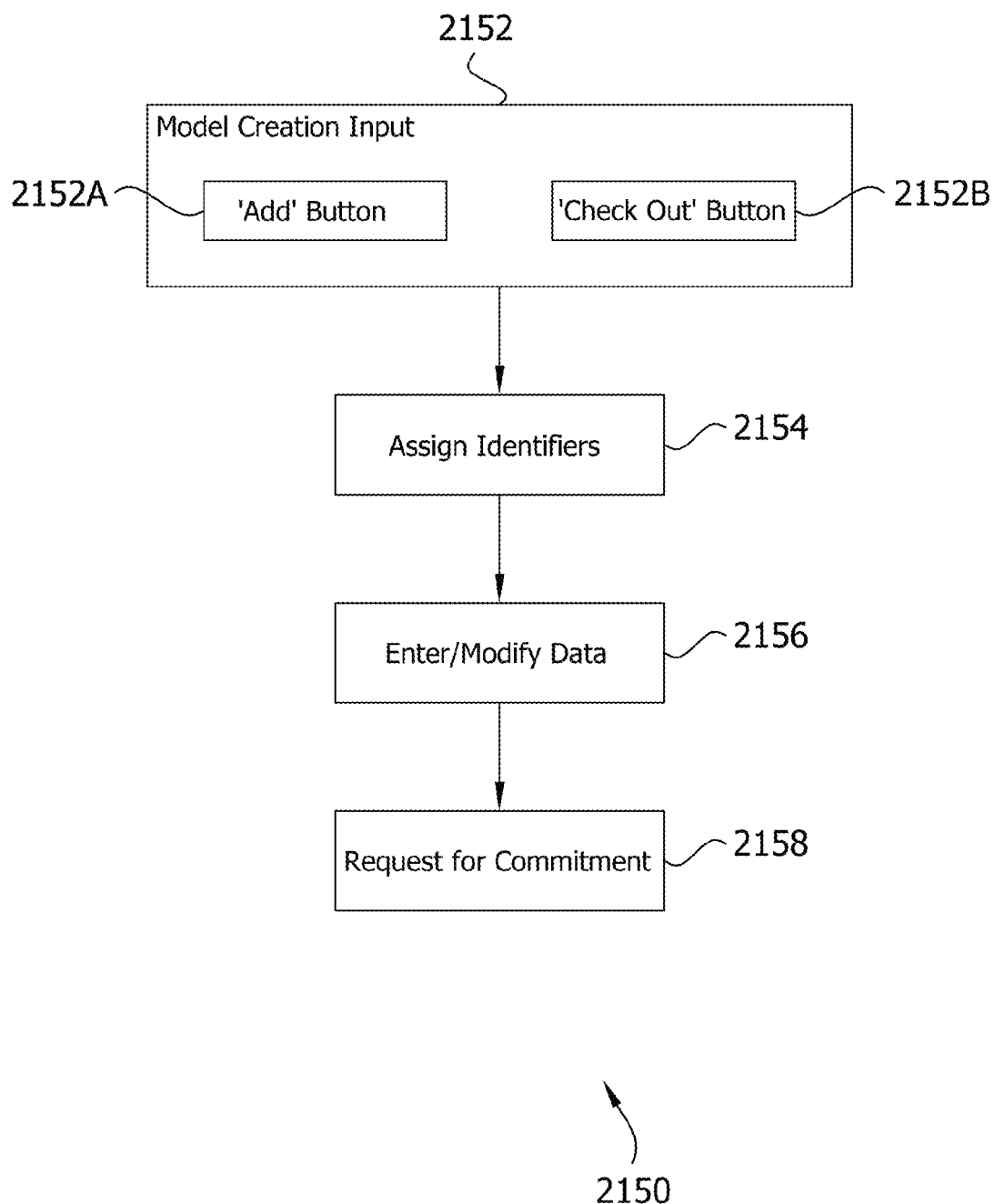
FIG. 21 is a flowchart illustrating steps for creating or modifying a model.

As shown in FIGS. 20 and 20A, the versioning scheme 2000 begins at step 2001 when the recipe management system receives configuration inputs creating an initial formula template model 67. In response to receipt of user inputs creating an initial version of the formula template model 67' (step 2001), the recipe management system assigns a first root identifier, first primary key identifier, and first version identifier to the model 67' (step 2002) (e.g., the recipe management system creates an initial formula template model 67' with a formula template record 66 with a primary key field 132 for the first primary key identifier, a root field 134 for the first root identifier, and a version field 136 for the first version identifier (FIG. 7)). The first root identifier indicates that the model 67' is one version of a particular formula template model. The first primary key identifier indicates that the model 67' is a specific one of all the versions of all the models saved in the configuration database. The first version identifier indicates that the model 67' is a first version of the particular formula template model.

After a formula template model 67' is saved to the configuration database, configuration inputs creating a new formula instance model 71' are received (step 2003). In response, the recipe management system automatically assigns a second root identifier, a second primary identifier, and the first version identifier to an initial formula instance model 71' (step 2004) (e.g., the recipe management system creates a formula instance model 71' with a formula instance record 70 with a primary key field 150 for the second primary key identifier, a root field 152 for the second root identifier, and a version field 154 for the first version identifier (FIG. 5)). The second root identifier indicates that the model 71' one version of a particular formula instance model. The second primary key identifier indicates that the model 71' is a specific one of all of the versions of all the models saved in the configuration database. The first version identifier 154 indicates that the model 67' is a first version of the particular formula instance model. In the illustrated example, the initial formula instance model 67' and formula template model 71' are first versions of the respective types of models. The illustrated recipe management system preferably uses the same identifier value (e.g., an integer '1') to identify that each model 67', 71' is a first version, regardless of the model type. Also, in response to the inputs creating the initial version of the formula instance model 71' (step 2003), the recipe management system assigns a pointer from the formula instance model to its defining formula template model 67' (step 2005). As discussed above, the illustrated recipe management system 10 creates formula instance models 71' from the previously created formula template models 67'. In the illustrated embodiment, a foreign key stored in the formula instance model 71' and referencing the primary key of the defining formula template model 67' (i.e., the first primary key) is used to point thereto (e.g., the recipe management system creates a formula instance model 71' with a formula instance record 70 that has a formula template identifier field 160 with a foreign key reference to the initial formula template model 67' (FIG. 5)). In other embodiments, however, other pointers may be assigned to defined models to point to their defining models without departing from the scope of the invention.

At this point, an initial formula template model 67' is saved to the configuration database, an initial formula instance model 71' is saved to the configuration database, and a pointer is assigned to the formula instance model that references the initial formula template model. Next, user inputs requesting modification of the initial formula instance model 71' are received (step 2006). As discussed above, inputs requesting modification of a model is one type of input requesting creation of a new version of a model. Accordingly, the sequence of inputs depicted in FIG. 21 applies to a modification request 2006. In response to the modification request 2006, the recipe management system assigns the second root identifier for the formula instance, a third primary identifier, and a second version identifier to a first updated formula instance model 71" (step 2007) (e.g., the recipe management system creates a formula instance model 71" with a formula instance record 71 with a primary key field 150 for the third primary key identifier, a root field 152 for the second root identifier, and a version field 154 for the second version identifier (FIG. 7)). The second root identifier indicates that the model 71" is another version the same formula instance model as the initial formula instance model 71'. The third primary key identifier indicates that the model 71" is a specific one of all the versions of all the models stored in the configuration database. The second version identifier indicates that the model 71″ is a second version of the particular formula instance model.

The first updated formula instance model 71″ is also assigned a pointer to the initial formula template model (step 2008) (e.g., the recipe management system creates a formula instance model 71″ with a formula instance record 70 that has a formula template identifier field 160 with a foreign key reference to the initial formula template model 67′ (FIG. 5)). Because the first updated formula instance model 71″ is based on the same formula template model 67′ as the initial formula instance model 71′, it receives the same foreign key reference. No new versions of the initial formula template model 67′ are created in the illustrated embodiment in response to the user inputs received at step 2006. Thus, changes may be made to formula instance models 71 (i.e., the defined model) that are not reflected in the parent formula template model 67 (i.e., the defining model).

Subsequently, user inputs requesting modification of the initial formula template model 67′ are received (step 2009). In response, the recipe management system assigns the first root identifier, a fourth primary key identifier, and the second version identifier to an updated formula template model 67″ (step 2010) (e.g., the recipe management system creates a formula template model 67″ with a formula template record 66 with a primary key field 132 for the fourth primary key identifier, a root field 134 for the first root identifier, and a version field 136 for the second version identifier (FIG. 5)). The first root identifier indicates that the model 67″ is another version of the same formula template model as the initial formula template model 67′. The fourth primary key identifier indicates that the model 67″ is a specific one of all of the versions of all of the models in the configuration database. And the second version identifier indicates that the model 67″ is a second version of the particular formula template model. In the illustrated example, the first updated formula instance model 71″ and updated formula template model 67″ are second versions of the respective models. The illustrated recipe management system uses the same identifier value (e.g., an integer '2') to identify that a model is a second version, regardless of the model type. Thus, the updated formula template and first updated formula instance models 67″, 71″ are each given the second version identifier (e.g., an integer '2').

The recipe management system retains the initial formula template model 67′. In addition, using the pointer from the first updated formula instance model 71″ to the initial formula template model 67′, the recipe management system will recognize that the first updated formula instance is out of date with respect to the updated formula template 67″. In response, the recipe management system sets an update flag in the first updated formula instance model 71″ indicating that it is out-of-date (step 2011). For example, an upgrade formula template field 164 (FIG. 5) may be changed in a formula instance record 70 of a first updated formula instance model 71″. The recipe management system will further display an indication that the first updated formula instance record 71″ is based on an outdated formula template model. An update icon may, for example, be displayed next to the first updated formula instance in a corresponding tile on the formula instance tiles view (FIG. 17). The recipe management system will, however, refrain from creating a second updated formula instance model incorporating the changes made to its defining formula template model (e.g., the changes made to the initial formula template model 67′, which defines the first updated formula instance model 71″, to create the updated formula template model 67″) until it receives an input from a user requesting the first updated formula instance model 71″ be updated.

Upon receipt of a request to update the first updated formula instance 71″ in accordance with changes made to its defining initial formula template 67′ (step 2012), the recipe management system will assign the second root identifier, a fifth primary identifier, and a third version identifier to a second updated formula instance 71‴ (step 2013) (e.g., the recipe management system creates a formula instance model 71‴ with a formula instance record 71 with a primary key field 150 for the fifth primary key identifier, a root field 152 for the second root identifier, and a version field 154 for the third version identifier (FIG. 7)). The second root identifier indicates that the model 71‴ is another version of the same formula instance model as the initial and first updated formula instance models 71′, 71″. The fifth primary key identifier indicates that the model 71‴ is a specific one of all the versions of all the models in the configuration database. The third version identifier indicates that the model 71‴ is a third version of the particular formula instance model. The recipe management system will also assign a pointer to the updated formula template model 67″ that associates the second updated formula instance model 71‴ with the updated formula template model (i.e., its defining model) (step 2014). For example, the illustrated recipe management system will assign a foreign key identifier equal to the primary key identifier of the updated formula template model 67″ (e.g., the fourth primary key identifier).

As discussed above, formula template models 67 and formula instance models 71 are not saved as standalone entities on the configuration database. In the above-described method 2000, the entities of a model are in a checked out state each time the recipe management system receives a request to create or modify a model. The checked out flag is set in the respective formula template record 66 or formula instance record 70. While the association between formula instance records 70 and their parent formula template records 66 is configured to defer change propagation, the association between these entities and their formula parameter records 68 and formula parameter detail records 72 produces automatic change propagation. Thus, if a user accesses a formula template details view 1600 (FIG. 16) and checks out a formula template model 67, changes made to one formula parameter detail record 72 or formula template record 66 propagate to the related records in the formula template model. For example, returning to FIG. 15, consider a scenario where the user changes the default value for the BottleQuantity parameter from 12 to 144 and checks in the updated formula template model 67. The Beer formula template model 67 would be updated to a new version, with a new primary key and version identifier. The new primary key identifier will render all the formula parameter records 68 associated with the previous version of the Beer formula template model 67 out of date because their formula template identifier fields will not match the newest version of the formula template record. Each of the formula parameter entities 68 will be updated to create new records. This will render the formula parameter detail entities 72 out of date, and each of these must be updated as well. Thus, a small change to one aspect of one record will cause an update to all of the records in a formula template model 67 or formula instance model 71. These changes are made automatically by the recipe management system. Prior versions of the formula template model 67 and formula instance models 71 are preferably retained in full.

Figure 22:
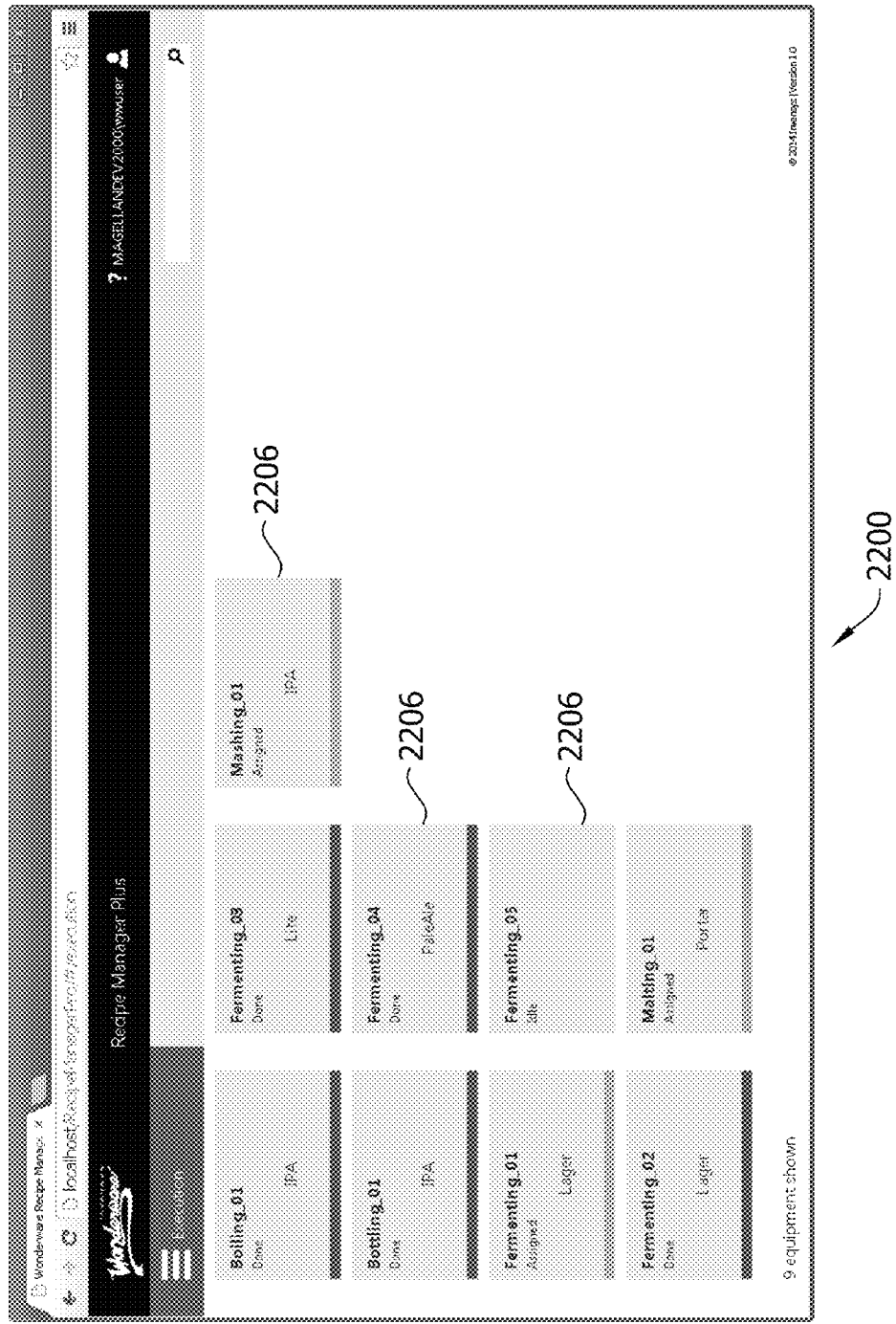
FIG. 22 is a screenshot of an execution tiles view.

Referring to FIGS. 2-6, once a formula model 54 and equipment model 52 are configured as desired, the recipe management system may be used to execute a control recipe. As discussed above, equipment models 52 and formula models 54 are created to be mapped to one another in a control recipe. Thus, each formula instance record 70 is associated with the same number and types of formula parameter records 68 as an equipment record 60 is associated with equipment parameter records 62. If this condition is satisfied, the process of executing a control recipe may begin by mapping an approved formula model 54 to an approved equipment model 52. To execute a control recipe, a user selects the execution selection item from the main menu 300 (FIG. 7) of the recipe management execution client 24 (labelled as "runtime client") to navigate to an execution tiles view 2200, as illustrated in FIG. 22. The execution tiles view 2200 includes a tile 2206 for each of the currently approved equipment entities in the configuration database. Each approved equipment tile 2206 displays information about the equipment represented by an approved equipment model 52, including its name, execution state, and the formula currently or previously loaded thereto. Additionally, each tile 2206 includes a color bar (at bottom) that changes in accordance with the runtime state of its equipment record.

Figure 23:
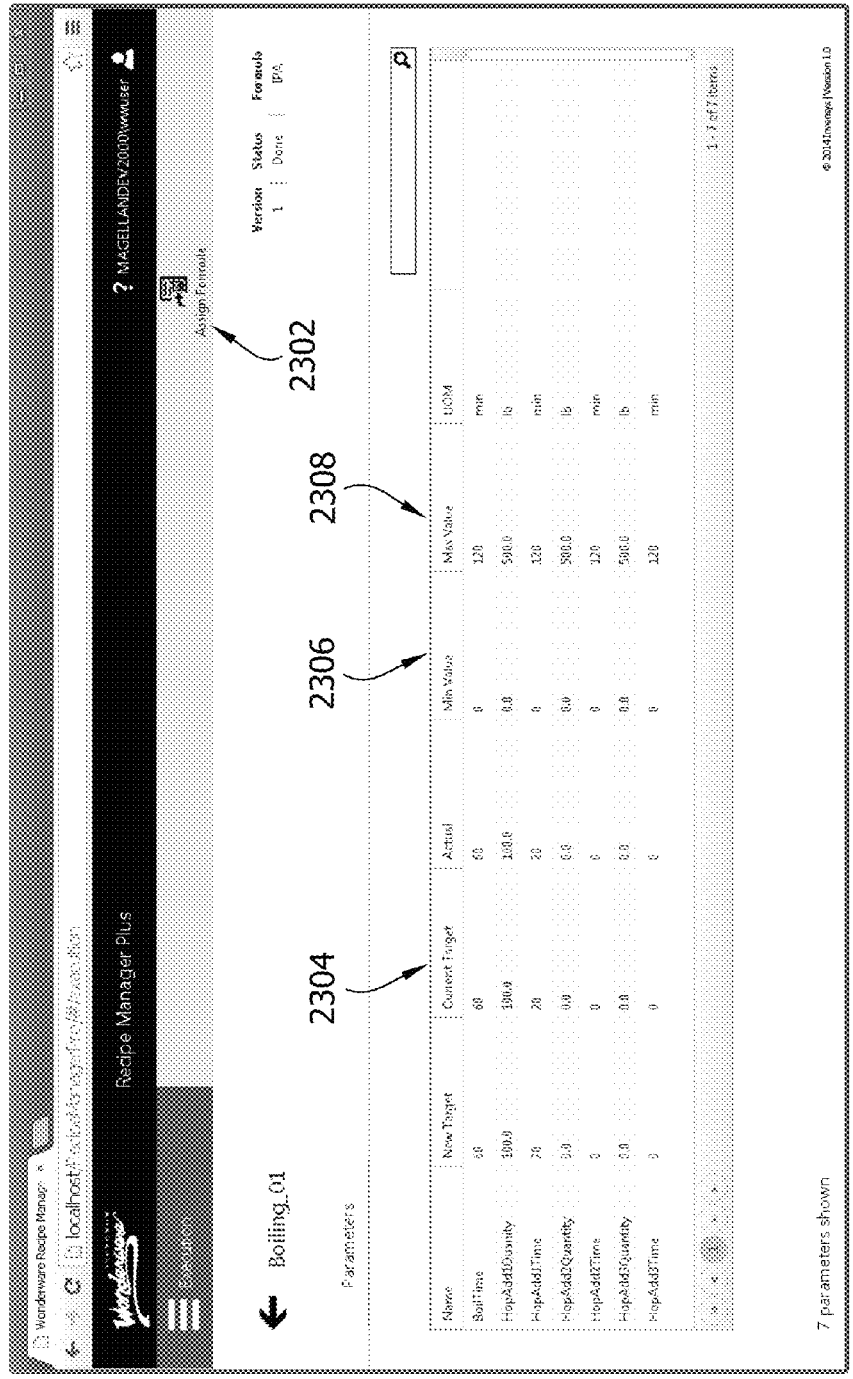
FIG. 23 is a screenshot of an execution details view.
Figure 23A:
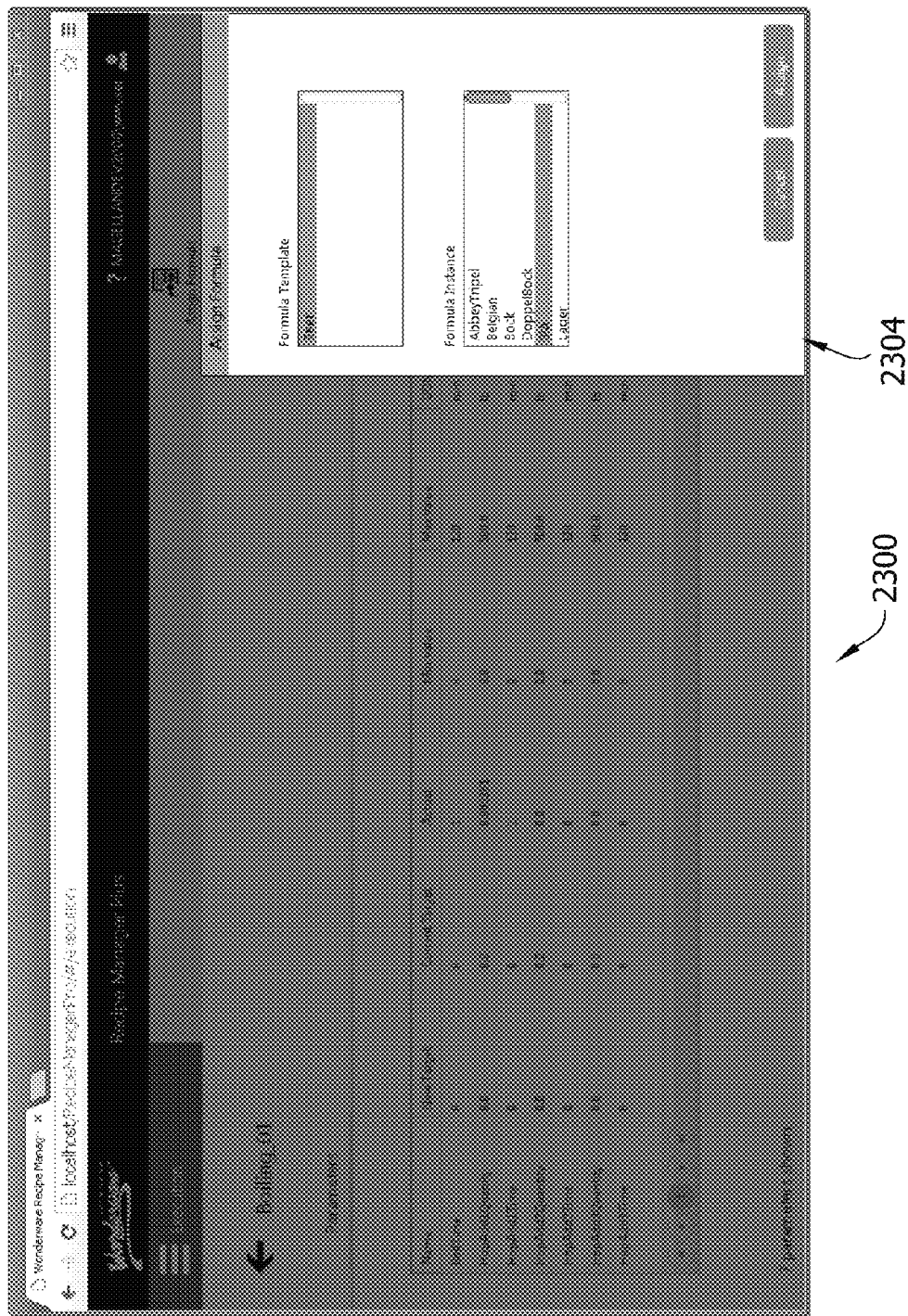
FIG. 23A is a screenshot of the execution details view with a slide out formula assignment menu opened.

The user may select an approved equipment tile 2206 to bring up an execution details view 2300 for the equipment, as shown in FIG. 23. To create a new recipe model 56, the user selects the assign formula button 2302 at the upper right corner of the view, which brings up a side scroll menu 2304 containing a selectable list of the formula instance models 71 that can be assigned to the equipment model 52 (FIG. 23A). The user selects the desired formula instance model 71 from the list and clicks assign to create a recipe model 56. A recipe record 74 is created with a foreign key reference to an equipment record 60 for the equipment model 52 selected at the execution tiles view 2200 and a foreign key reference to a formula instance record 70 for the formula instance model 71 selected at the execution details view 2300. The recipe model 56 is placed into the checked out state and is marked as a control recipe (e.g., using the control recipe field 214 of the recipe record 74 (FIG. 6)). A copy of the associated formula instance model 71 is made, placed in a checked out state (e.g., using the checked out field 155 as shown in FIG. 5), and has its control instance flag set (e.g., using the control instance field 162). If a control recipe had previously existed for an equipment model 52, it is deleted before the new control recipe is created. The checked out recipe model 56 and copied formula instance model 71 are included in a control recipe. Data in the control recipe, as well as data in the approved equipment model 52 to which the control recipe is loaded, is accessed by the execution engine 26 to execute a recipe on a piece of equipment 16 in a process plant 18.

In the recipe model 56, a recipe parameter map record 76 is created for each parameter in the control recipe. Each recipe parameter map record 76 uses foreign keys to point to a formula parameter record 68, equipment parameter record 62, and its parent recipe record 74. If there is other than one-to-one correspondence between equipment parameter records 62 and formula parameter records 74, errors will be shown in the execution details view 2300. Mapping failure can also occur, for example, for the following reasons: an equipment parameter record's name does not match that of a formula parameter record; a formula parameter detail record's target value is not within the limits of the equipment parameter record's high and low limit; and an equipment parameter record's unit of measure does not match a formula parameter detail record's unit of measure.

Figure 24:
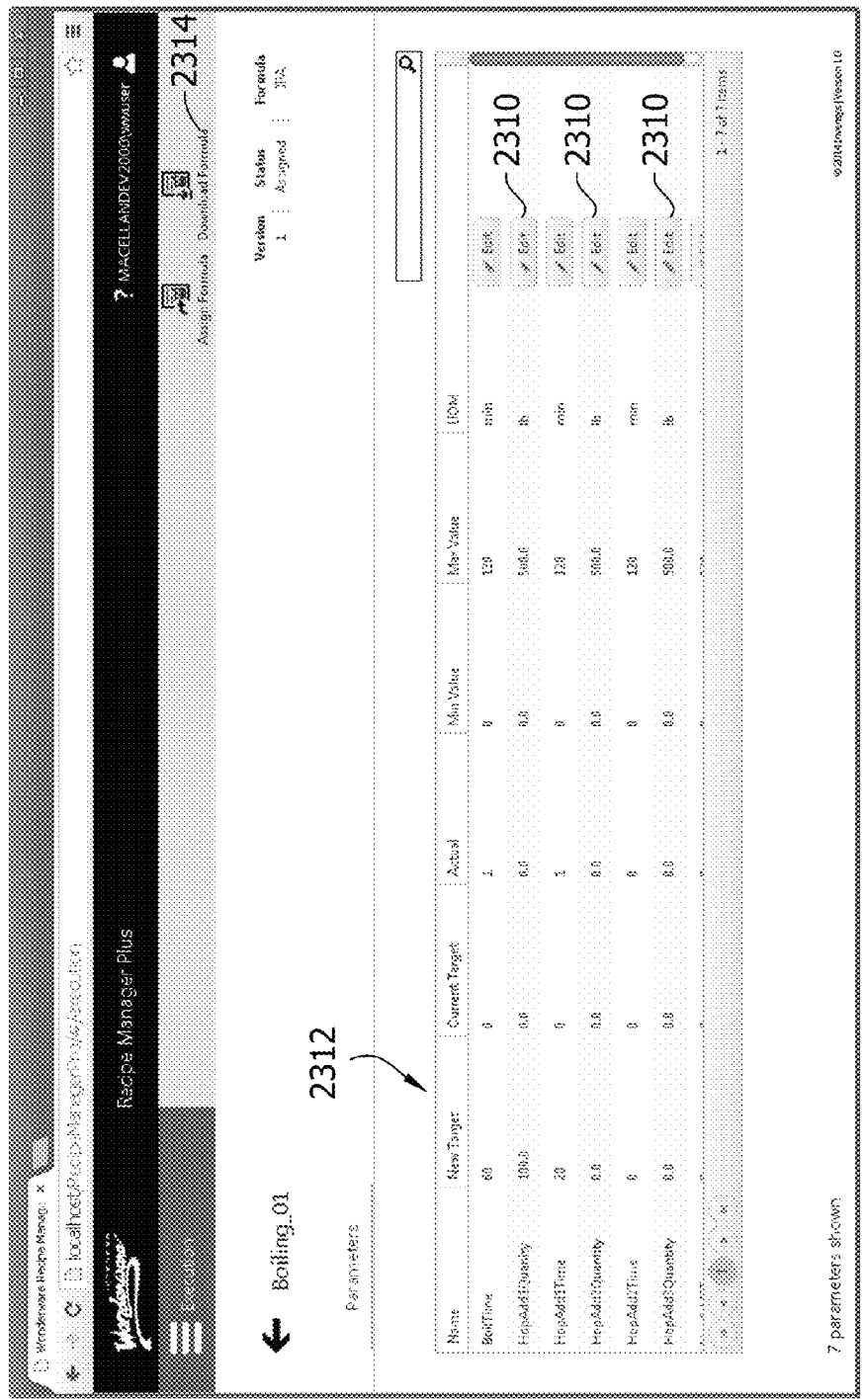
FIG. 24 is another screenshot of the execution details view.

Once the formula instance model 67 is assigned to the equipment model 52, the parameters of the control recipe will be displayed on the execution details view 2300. The current target field 2304 will include the target value from the formula parameter detail record 72 associated with the control recipe. For each parameter in the control recipe, fields 2306, 2308 for minimum and maximum values are set based on the most restrictive maximum and minimum values from either the equipment parameter record 62 or the formula parameter detail record 72. As shown in FIG. 24, the user selects an edit button 2310 for a control recipe parameter to change the target value for the parameter. If the target value is changed, a new target field 2312 will reflect the change. In the control recipe model 56, the runtime target value field 228 for the respective recipe parameter map record 76 will be given a value to reflect the new target. Once the user has configured the control recipe model as desired, the download formula button 2314 may be selected to begin executing the recipe. The control recipe and approved equipment model 52 are passed to the execution engine 26, which executes a recipe on a respective piece of equipment 16 in the process plant 18 by reading and writing to the addresses stored in the IO bits of the equipment model 52 in the control recipe.

In the illustrated recipe management system, control recipe models 56 are associated with one approved equipment model 52, and control recipes execute independently from other equipment models stored in the configuration database. The system loads a single version of an approved equipment model 52 to the execution engine 26 at runtime. Other equipment models 52 are not affected. A user may configure multiple equipment models 52 for various pieces of equipment 16 in a process plant 18 that can carry out a control recipe. The user has the freedom to run a control recipe on one piece of equipment 16 while configuring or modifying the equipment models 52 that represent the other pieces of equipment. A user is able to access the configuration client to modify equipment models 52 that are not currently being run in the runtime system. Modifications may be made without affecting the runtime system. In addition, as discussed above, the equipment models 52 in the illustrated recipe management system are versioned. The system maintains copies of each version of an equipment model 52 dating back to its initial version. Thus, for equipment models 52 that are currently executing in the runtime system 14, a user is still permitted to make modifications to different versions of the same equipment model 52. These changes may be checked into the configuration database without causing the runtime system 14 to restart.

Figure 28:
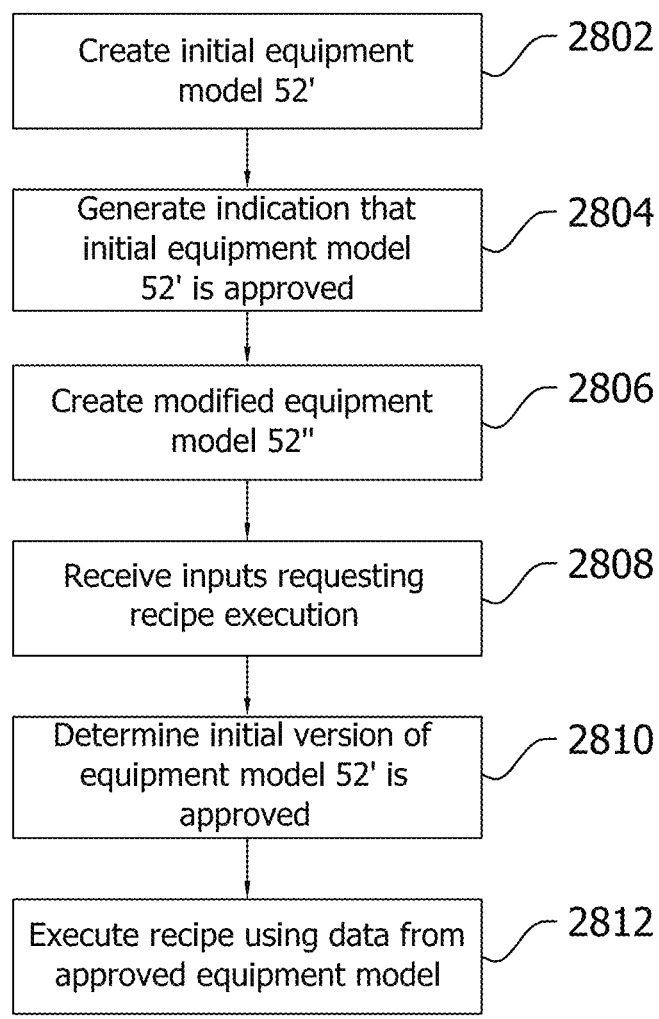
FIG. 28 is a flow chart of the steps of executing a recipe using an approved equipment model.

Referring to FIG. 28, the illustrated recipe management system is configured to execute the steps in the method 2800 to ensure that only approved equipment models 52 are used in a control recipe. At step 2802, an initial version of an equipment model 52' is created and stored in the configuration database in response to user inputs. For example, a user can supply inputs to the views 700-1200 of FIGS. 7-12 to create the initial version of the equipment model 52'. At step 2804, the recipe management system 10 generates an indication that the initial version of the equipment model 52' is an approved version. For example, the recipe management system 10 can automatically generate the indication or do so in response to user inputs. In one embodiment, from the equipment model details view 1100 of FIG. 11, the user selects the approved item from the state drop down menu 1108. As a result, the state field 96 for the equipment record 60 of the initial version of the equipment model 52' is set to approved. At step 2806, in response to user inputs, the recipe management system 10 creates a modified version of the equipment model 52". No indication that the modified version of the equipment model 52" is an approved version is generated. User inputs are required to generate an indication that the modified version of the equipment model 52" is the approved version, and in the illustrated example, none are received. After creating the modified version of the equipment model 52", the recipe management system 10 receives user inputs requesting execution of the recipe on the piece of equipment 16 represented by the initial version of the equipment model 52' and the modified version of the equipment model 52" (step 2808). In response to the inputs of step 2808, the recipe management system determines that the initial version of the equipment model 52' is approved (step 2810), and executes the recipe using the data from the approved equipment model 52' and a control recipe to execute a recipe on the piece of equipment 16 in the process plant (step 2812). Thus, the illustrated recipe management system only uses an approved equipment model 52 in recipe execution, even when a newer version of an equipment model has been created.

In some embodiments, the runtime client 24, which permits the user to interact with the execution system 12 of the recipe management system, appears the same when the recipe management system 10 is configured to run the execution engine 26 as a standalone executable and when the recipe management system is configured to run the execution engine hosted in a system platform 28. Thus, the user is presented with the same views 2200, 2300 whether the execution engine 26 runs as a standalone executable or is hosted in the system platform 28. However, at the execution tiles page 2200, the user is only able to select tiles for the equipment models 52 that have been imported to the system platform 28. In the illustrated embodiment, the recipe management system server 22 also performs the same steps to associate the various records needed to create a control recipe whether the execution engine 26 runs as a standalone executable or is hosted in the system platform 28. However, as discussed above, when the execution engine 26 is hosted in the system platform 28, the equipment model 52 is hosted in an application object of the system platform 28, which is where the IO reference tags for the piece equipment 10 are stored. When hosted in a system platform 28, the illustrated recipe management system 10 will not allow a control recipe to be loaded using an equipment model 52 of a different version than one stored on an application object of the system platform.

Referring to FIG. 1, the scan-based execution engine 26 of the recipe management system is able to run as either a standalone executable or hosted in a system platform 28 using the same execution logic and code base (i.e., the same execution code, which runs a scan-based execution engine, is used whether the execution engine is hosted in a standalone hosting environment or a system platform). It is contemplated that the aspects of the execution engine that enable it to run as a standalone executable or hosted in a system platform 28 can be applied broadly to any type of supervisory control system to run any type of supervisory control routine. In the recipe management system 10, this capability allows users who are also users of a system platform 36 to run the execution engine 26 as a system platform application object. For other users who do not use a system platform 28, the same execution logic may be used in a standalone environment. If the execution engine 24 is hosted in a standalone environment, the execution engine is scalable for conducting execution of one or more control routines on a plurality of pieces of equipment. In the illustrated embodiment, the system platform 28 is a Wonderware System Platform. The Wonderware System Platform 28 executes process control routines in application objects that run on nodes in the process plant (not shown). Typically, a process plant will have multiple nodes. Thus, application objects running separate execution engines 26 may be run on multiple nodes in the process plant at the same time. Moreover, if one node fails, other nodes in the system provide redundancy.

In the illustrated system platform 28, the execution engine 26 runs on an application object associated with one version of an equipment model 52. Thus, the execution engine 26 is tied to a deployed version of a particular equipment model 52. In the standalone system 10, each time a new type of equipment model 52 is created, an instance of an execution engine 26 for that type of equipment 16 is created. When a control recipe is to be executed, the instance of the execution engine 26 associated with the piece of equipment 16 in the control recipe loads the approved version of the equipment model 52. The execution engines 26 used in the standalone and system platform hosting environments 10 are both configured to use the same logic and code base to execute a control recipe.

The common execution engine interfaces with its hosting environment and with the recipe management system server 22. Application programming interface (API) calls are placed by the hosting environment to instruct the execution engine 26 to take certain actions. In one embodiment, the API exposes the following calls: RuntimeStartup, RuntimeExecute, Formula Name, GetControlRecipeStatus, StartControlRecipe, GetStartControlRecipeStatus, Assign Formula, and GetAssignFormulaStatus. RuntimeExecute is called every scan cycle by the host to execute a scan cycle. FormulaName instructs the execution engine to return the name of the currently assigned formula. GetControlRecipeStatus is called to return the status of the current control recipe. StartControlRecipe starts the currently assigned formula, an asynchronous function. GetStartControlRecipeStatus returns the status of the start control recipe call. AssignFormula instructs the execution engine to download a new formula. GetAssignFormulaStatus returns the status of the AssignFormula call. The recipe management system server 22 sends execution events to the execution engine 26, and the execution engine sends execution events to the recipe management system server. The execution events include an indication that the execution engine 26 has started and an indication of the actual values of monitored IO. The execution engine 26 also communicates with IO in the process plant using IO tasks that respectively register IO parameters for a piece of equipment 16, read monitored IO from the piece of equipment, and write parameters to IO in the piece of equipment.

Figure 25:
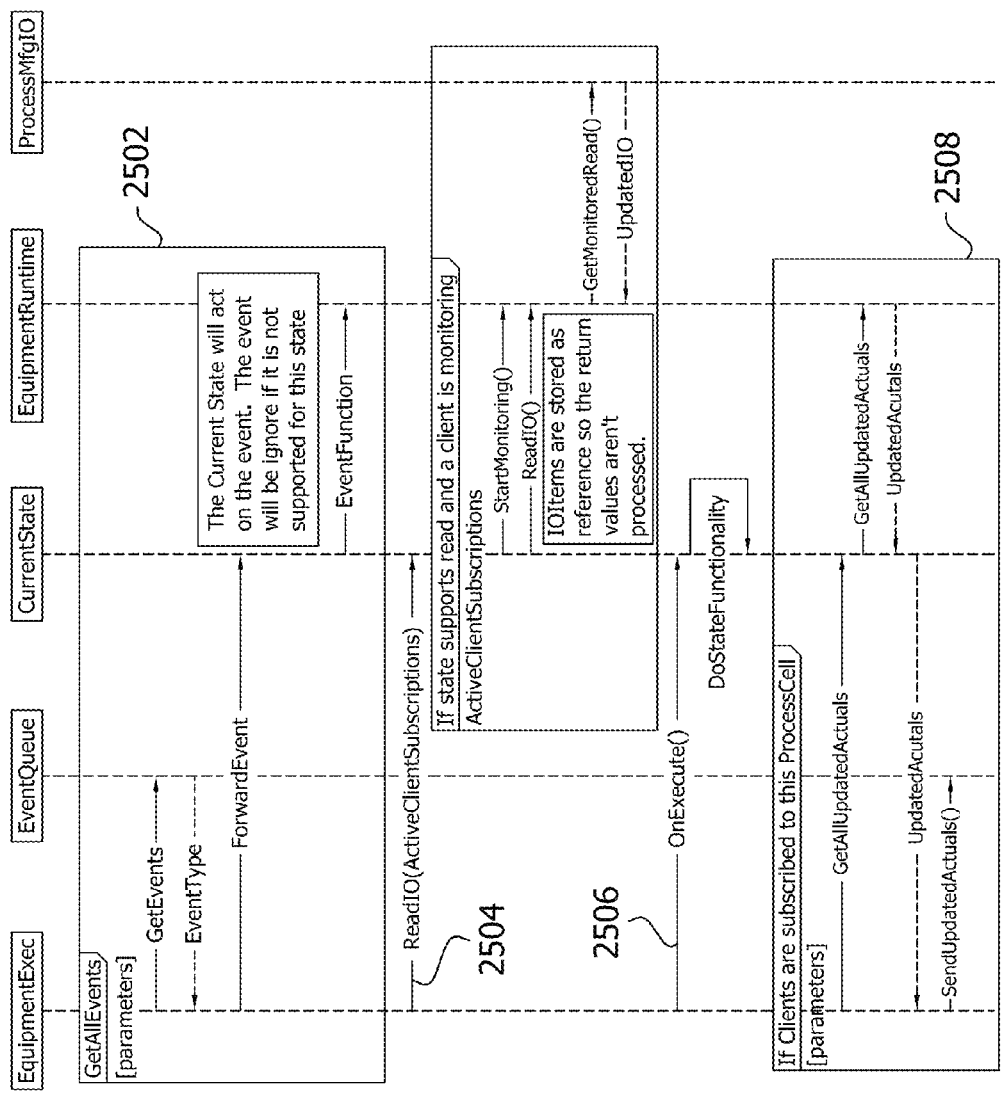
FIG. 25 is a block diagram of a runtime execution sequence for an embodiment of a common execution engine.
Figure 26:
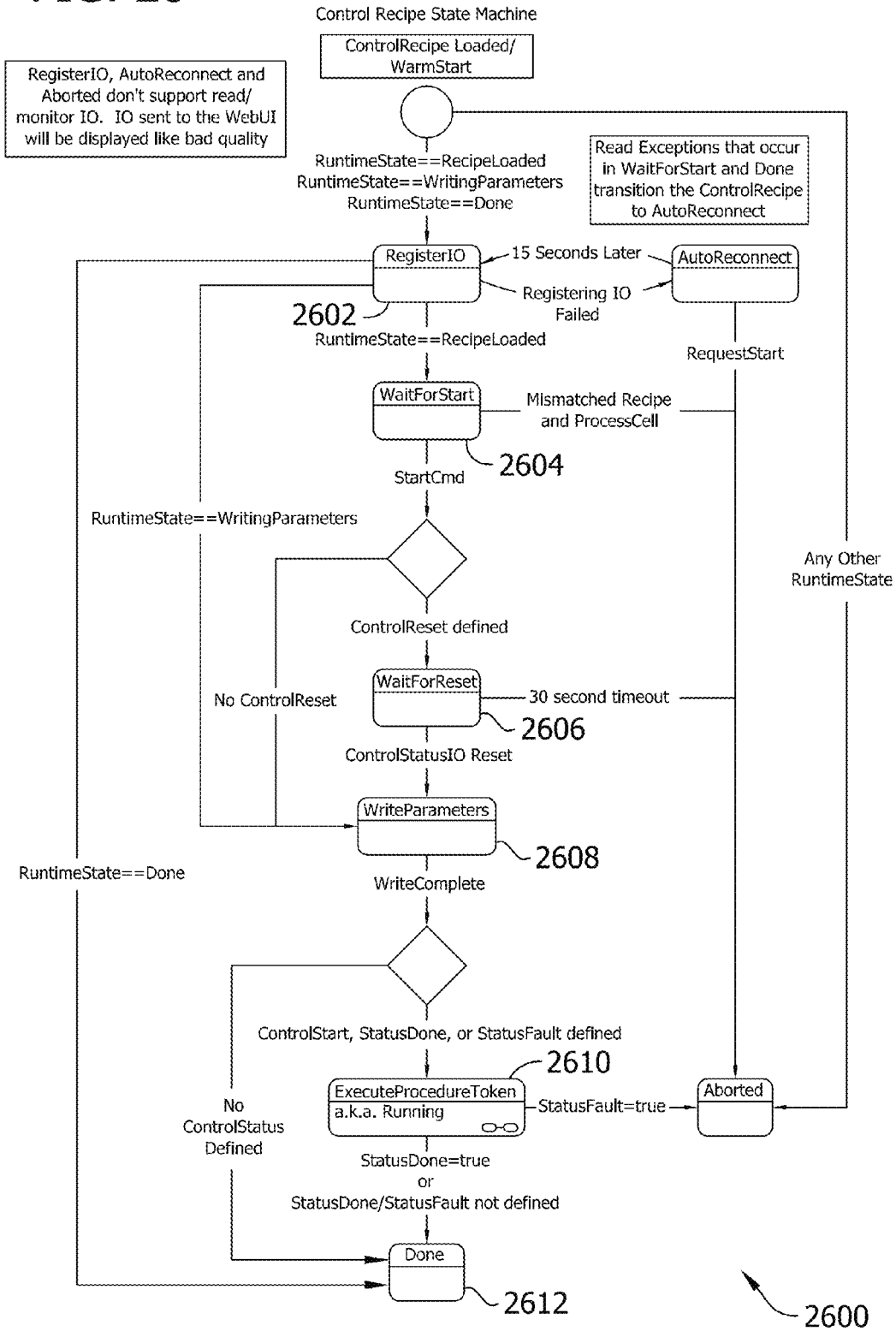
FIG. 26 is a block diagram of a state machine for the common execution engine.

During runtime, the execution engine 26, whether hosted in a standalone environment or a system platform, runs on regular scan intervals 2500, an embodiment of which is illustrated in FIG. 25. During each scan interval, at a GetAllEvents step 2502, the execution engine 26 will check for events, forward events applicable to the current runtime state, and process applicable events. After processing events, the common execution engine 26 will, at step 2504, read IO from the piece of equipment 16. Depending on the runtime state, the execution engine 26 will run an OnExecute 2506. All execution engines 26 that have a control recipe assigned to them have a state (discussed in reference to FIG. 26, below). This state determines what specific activity needs to be performed during a scan cycle. Specific states have specific OnExecute functionality assigned to them. The running of an OnExecute 2506 will cause the execution engine to perform the state-based functionality for a control recipe at a given time. The execution engine will next read all updated actual values from the piece of equipment 16 and send the updated actual values, for example, in a SignalR event (step 2508). During recipe execution, the common execution engine 26 is also running the state machine 2600 of FIG. 26. The progress of the recipe with respect to the state machine 2600 determines the execution state for purposes of carrying out a scan 2500. When a control recipe is loaded the execution engine 26 initially registers IO (state 2602). When IO registration is complete, it waits for a start command from the hosting environment (state 2604). Depending on whether a control reset is required, the recipe either waits for the reset (state 2606) or begins writing parameters (state 2608). When the parameters have been written to the IO, the recipe is run on the piece of equipment 16 (state 2610). When the recipe is completed, the state machine enters the done state 2612.

In some embodiments, the recipe management system 10 uses a parameter download verification system before executing a recipe. Recipe execution requires data to pass through several communication layers before it is actually used to run a recipe on a piece of equipment 16. For example, in the illustrated recipe management system 10, parameter values pass from a recipe management system configuration server 22, through an API to an execution engine 26, and to IO in the piece of equipment 16 in the process plant 18. This layered communication structure can reduce data integrity (e.g., the communications systems may introduce rounding errors, etc.), which in turn causes problems carrying out a recipe. Prior systems write parameter values to IO and receive a return indicating the write request was successful. However, in the case of rounding errors, this does not provide the user a means for knowing if the value of a parameter was the true value intended.

Figure 27:
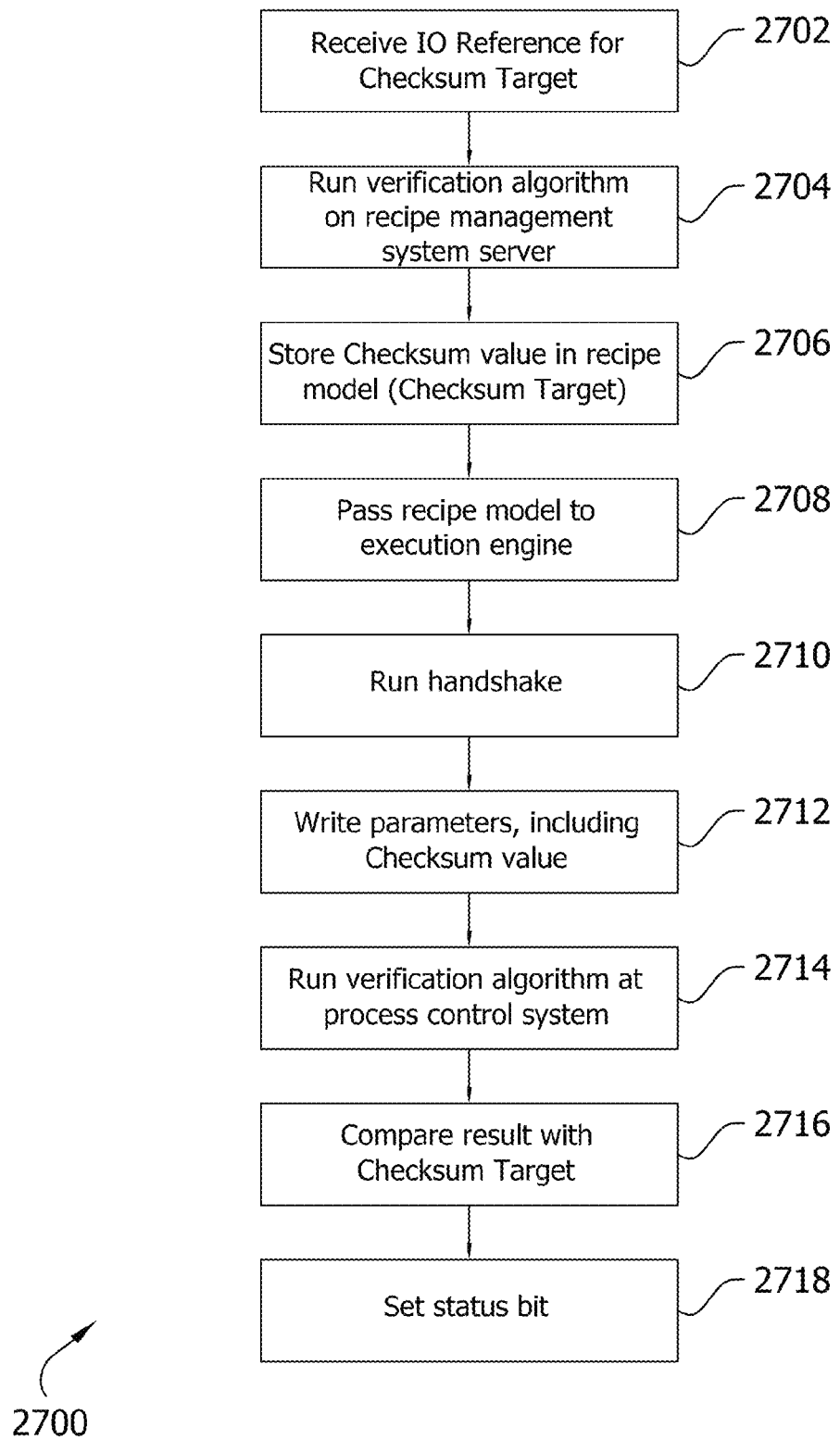
FIG. 27 is a flow chart of the steps of a parameter verification method.

The illustrated recipe management system 10 provides an improved system for verifying the download of parameters to a piece of equipment 16. As shown the verification method 2700 of FIG. 27, to use the verification feature, a user provides an IO reference tag for a checksum target (step 2702) (e.g., using an IO reference view of FIG. 11 or 12). This reference tag represents the IO address used to store a checksum value (broadly, a verification value). In the illustrated embodiment the recipe management server includes, among its stored procedures 58 (FIG. 2), a default verification algorithm (broadly, a verification test). If the default verification algorithm does not suit a user's recipe parameters, the user may configure a user-defined verification algorithm. Prior to executing a control recipe, the recipe management system 10 executes a stored procedure and runs the verification algorithm (step 2704). The result of the verification algorithm is the checksum target, and it is stored in the recipe model 56 (step 2706). More particularly, at step 2706, the illustrated recipe management system 10 stores the checksum value in the checksum target field 216 of the recipe record 74 of the recipe model 56 (FIG. 6). After storing the checksum value, the recipe management system 10 passes the control recipe model 56 to the execution engine 26 for execution on the piece of equipment 16 in response to user inputs.

In some embodiments, when the user runs the control recipe, an optional handshake routine (step 2710) between the execution engine and the process plant is run. If the user chooses not to execute the handshake routine, the execution engine will simply write the checksum value to the appropriate IO reference tag (step 2712). In a preferred embodiment, the piece of equipment 16 on which the recipe is to be run has control and status bits for facilitating the handshake. In particular, the illustrated embodiment has a control reset bit at the IO address stored in the IO reference reset field 100 of the equipment record 60 (broadly, a bit for initiating parameter download), a status done bit at the IO address stored in the IO reference done field 102 of the equipment record 60 (broadly, a bit for indicating successful parameter download), and a status fault bit at the IO address stored in the IO reference fault field 104 of the equipment record 60. As discussed above, the execution engine 26 uses an approved equipment model 52, which includes the equipment record 60. During the handshake routine, the execution engine 26 sets the control reset bit of the piece of equipment 16 to true. The control start, status done, and status fault bits will automatically be set to false. When the execution engine 26 reads that the control start, status done, and status fault bits have been set to false, it writes all parameters, including the checksum target value (stored in field 216 of the recipe record), to IO. The control system runs the verification algorithm using the written parameters (step 2714) and compares its result to the checksum target value written to its IO (step 2716). If the control system's result matches the checksum target value written to its IO, it sets its status done bit to true (step 2718). If the control system's result does not match the checksum target value written to its IO, it sets its status fault bit to true (step 2718). The execution engine 26 monitors (e.g., reads) theses status bits to determine whether the parameter download was successful. If successful, the execution engine 26 proceeds to execute the recipe (i.e., the control start bit is set to true). If unsuccessful, the recipe management server 22 provides an indication of parameter download failure to the user and does not execute the recipe until further action is taken. The use of status done and status fault bits to indicate the success or failure or the parameter download is but one suitable method. Other indications may also be used without departing from the scope of the invention.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. An industrial control system comprising a processor and memory for executing a recipe on a piece of equipment in a process plant by operating the piece of equipment in accordance with parameters of the recipe, the piece of equipment comprising input/output addresses for communication with the industrial control system, the industrial control system comprising:

a recipe configuration subsystem configured to create a recipe model representing the recipe in response to user inputs, the recipe model comprising recipe parameters representing the parameters of the recipe and being stored in a configuration database, the recipe configuration subsystem being configured to map the recipe parameters to the input/output addresses of the piece of equipment;

a recipe execution subsystem in communication with the recipe configuration subsystem and the piece of equipment and configured to download the recipe parameters to the input/output addresses of the piece of equipment; and a download verification subsystem configured to:
  execute a verification test using the recipe parameters stored in the configuration database before the recipe execution subsystem downloads the recipe parameters to the input/output addresses of the piece of equipment to determine a first verification value;
  execute the verification test using the downloaded recipe parameters to determine a second verification value;
  compare the first and second verification values to determine whether the recipe parameters were downloaded to the input/output addresses of the piece of equipment successfully; and
  provide an indication of parameter download failure when the download verification subsystem determines the recipe parameters were not downloaded successfully, the recipe execution subsystem being further configured to execute the recipe on the piece of equipment by operating the piece of equipment in accordance with the downloaded recipe parameters if the recipe parameters were downloaded successfully.

2. An industrial control system as set forth in claim 1 wherein the download verification subsystem is further configured to receive user inputs creating a user-defined verification test.

3. An industrial control system as set forth in claim 1 wherein the piece of equipment comprises a bit for initiating parameter download, a bit for indicating successful parameter download, and a bit for indicating failed parameter download.

4. An industrial control system as set forth in claim 3 wherein the download verification subsystem is further configured to set the bit for initiating parameter download to true prior to downloading the recipe parameters to the input/output addresses of the piece of equipment.

5. An industrial control system as set forth in claim 4 wherein the download verification subsystem is further configured to automatically set the bit for indicating successful parameter download and the bit for indicating failed parameter download to false when the bit for initiating parameter download is set to true.

6. An industrial control system as set forth in claim 3 wherein the download verification subsystem is further configured to set the bit for indicating successful parameter download to true when the verification subsystem determines the recipe parameters were downloaded to the input/output addresses of the piece of equipment successfully.

7. An industrial control system as set forth in claim 3 wherein the download verification subsystem is further configured to set the bit for indicating failed parameter download to true when the verification subsystem determines recipe parameters were not downloaded to the input/output addresses of the piece of equipment successfully.

8. An industrial control system as set forth in claim 3 wherein the download verification subsystem is further configured to read the bit for indicating successful parameter download and the bit for indicating failed parameter download to determine whether the recipe parameters were downloaded to the input/output addresses of the piece of equipment successfully.

9. An industrial control system as set forth in claim 3 wherein the download verification subsystem is further configured to provide said indication of parameter download failure when the bit for indicating failed parameter download is set to true.

10. An industrial control system as set forth in claim 3 wherein the recipe configuration subsystem is further configured to map the recipe model to input/output addresses of the piece of equipment for the bit for initiating parameter download, the bit for indicating successful parameter download, and the bit for indicating failed parameter download.

11. An industrial control system comprising a processor and memory for executing a recipe on a piece of equipment in a process plant by operating the piece of equipment in accordance with parameters of the recipe, the piece of equipment comprising input/output addresses for communication with the industrial control system, the industrial control system being configured to:
store a recipe model representing the recipe in response to user inputs, the recipe model comprising recipe parameters representing the parameters of the recipe and being stored in a configuration database;
map the stored recipe parameters to the input/output addresses of the piece of equipment;
store a verification test for determining a verification value using the recipe parameters;
execute the verification test using the stored recipe parameters to determine a first verification value;
download the recipe parameters to the input/output addresses of the piece of equipment;
execute the verification test using the downloaded recipe parameters to determine a second verification value;
compare the first verification value to the second verification value to determine whether the recipe parameters were downloaded to the input/output addresses of the piece of equipment successfully;
provide an indication of parameter download failure when the industrial control system determines the recipe parameters were not downloaded to the input/output addresses of the piece of equipment successfully; and
execute the recipe on the piece of equipment by operating the piece of equipment in accordance with the downloaded recipe parameters if the recipe parameters were downloaded to the input/output addresses of the piece of equipment successfully.

12. An industrial control system as set forth in claim 11 wherein industrial control system is further configured to download the first verification value to an input/output address of the piece of equipment.

13. An industrial control system as set forth in claim 11 wherein the piece of equipment comprises a bit for initiating parameter download, a bit for indicating successful parameter download, and a bit for indicating failed parameter download.

14. An industrial control system as set forth in claim 13 wherein the industrial control system is further configured to set the bit for initiating parameter download to true prior to downloading the recipe parameters to the input/output addresses of the piece of equipment.

15. An industrial control system as set forth in claim 14 wherein the industrial control system is further configured to automatically set the bit for indicating successful parameter download and the bit for indicating failed parameter download to false when the bit for initiating parameter download is set to true.

16. An industrial control system as set forth in claim 13 wherein the industrial control system is further configured to set the bit for indicating successful parameter download to true when the verification subsystem determines recipe parameters were downloaded to the input/output addresses of the piece of equipment successfully.

17. An industrial control system as set forth in claim 13 wherein the industrial control system is further configured to set the bit for indicating failed parameter download to true when the verification subsystem determines recipe parameters were not downloaded to the input/output addresses of the piece of equipment successfully.

18. An industrial control system as set forth in claim 13 wherein the industrial control system is further configured to read the bit for indicating successful parameter download and the bit for indicating failed parameter download to determine whether the recipe parameters were downloaded to the input/output addresses of the piece of equipment successfully.

19. An industrial control system as set forth in claim 18 wherein the industrial control system is further configured to provide said indication of parameter download failure when the bit for indicating failed parameter download is set to true.

20. An industrial control system as set forth in claim 13 wherein the industrial control system is configured to map the recipe model to input/output addresses of the piece of equipment for the bit for initiating parameter download, the bit for indicating successful parameter download, and the bit for indicating failed parameter download.

* * * * *